(12) United States Patent
Young et al.

(10) Patent No.: US 11,733,166 B2
(45) Date of Patent: Aug. 22, 2023

(54) SERS SUBSTRATE FABRICATION METHOD AND SERS DETECTION METHOD

(71) Applicant: National Defense Medical Center, Taipei (TW)

(72) Inventors: Jenn-Jong Young, Taipei (TW); Cheng-Cheung Chen, Taipei (TW); Chia-Ying Chin, Taipei (TW); Xin-An Chen, Taipei (TW); Hui-Ju Yen, Taipei (TW); Ying-Chuan Chen, Taipei (TW); Hsin-Lun Hsieh, Taipei (TW)

(73) Assignee: NATIONAL DEFENSE MEDICAL CENTER, Taipei (TW)

( * ) Notice: Subject to any disclaimer, the term of this patent is extended or adjusted under 35 U.S.C. 154(b) by 0 days.

(21) Appl. No.: 17/744,488

(22) Filed: May 13, 2022

(65) Prior Publication Data

US 2022/0390376 A1    Dec. 8, 2022

Related U.S. Application Data

(60) Provisional application No. 63/192,940, filed on May 25, 2021.

(51) Int. Cl.
| | |
|---|---|
| *G01N 21/65* | (2006.01) |
| *C23C 24/10* | (2006.01) |
| *C08L 39/06* | (2006.01) |

(52) U.S. Cl.
CPC .......... *G01N 21/658* (2013.01); *C08L 39/06* (2013.01); *C23C 24/106* (2013.01); *C08L 2205/035* (2013.01)

(58) Field of Classification Search
CPC . G01N 21/658; C08L 39/06; C08L 2205/035; C23C 24/106; C23C 26/00
See application file for complete search history.

(56) References Cited

U.S. PATENT DOCUMENTS 8,958,070 B2 * 2/2015 Wang .................. G01N 21/658
356/432

FOREIGN PATENT DOCUMENTS

| CN | 110344030 A | * 10/2019 | |
| WO | WO-2007149120 A2 | * 12/2007 | .......... G01N 21/648 |

* cited by examiner

*Primary Examiner* — Tarifur R Chowdhury
*Assistant Examiner* — Mohamed Doumbia
(74) *Attorney, Agent, or Firm* — Kirton McConkie; Evan R. Witt

(57) ABSTRACT

A fabrication method of a SERS substrate includes (a) preparing a hydrophilic membrane; (b) dipping the hydrophilic membrane in an alcohol; (c) immersing the hydrophilic membrane in a chloride ion aqueous solution; and (d) depositing Ag or Au nanoparticles on the hydrophilic membrane by suction filtration to form the SERS substrate. The hydrophilic membrane includes 10~20 wt % PVDF, PTFE, PC, PES, nylon, or mixtures thereof, 10~20 wt % PVP, and 0.2~1.6 wt % PMMA, PHEMA, or mixtures thereof.

12 Claims, 16 Drawing Sheets

SERS SUBSTRATE FABRICATION METHOD AND SERS DETECTION METHOD

CROSS-REFERENCE TO RELATED APPLICATION

This application claims the benefit of U.S. Provisional Application No. 63/192,940 filed on May 25, 2021, and entitled "HIGH SENSITIVITY ENHANCEMENT OF MULTI-SHAPED SILVER-NANOPARTICLE-DECORATED HYDROPHILIC PVDF-BASED SERS SUBSTRATES USING SOLVATING PRETREATMENT". The entire contents of the above-mentioned patent applications are incorporated herein by reference for all purposes.

FIELD OF THE INVENTION

The present invention relates to a surface-enhanced Raman scattering (SERS) substrate, and more particularly to a fabrication method of the SERS substrate and a SERS detection method using the SERS substrate.

BACKGROUND OF THE INVENTION

Recently, Raman spectroscopy, an emission technique that involves the inelastic scattering of incident laser energy resulting in spectral peaks, has emerged as an attractive alternative for chemical analysis. Raman bands result directly from molecular vibrations, and almost all polyatomic compounds exhibit characteristic Raman scattering. These vibrations are extremely sensitive to changes in the chemical environment and structure. Since the spectral peaks vary with only slight differences in the molecular environment, Raman spectroscopy can be used to differentiate between chemical structures or conformations that contain the same atoms. Most Raman peaks have a narrow width suitable for multiplex analysis, and the spectra can be saved as a fingerprint for structural identification. Fitting a Raman spectrometer with a microscope or fiber-optic probe provides flexibility in the collection volume, and samples ranging from micrometer range to several centimeters across can be analyzed. Most importantly, this technique can analyze samples in aqueous solutions, such as suspensions or biological samples. Thus, time-consuming extraction or drying pretreatment which could potentially change the chemical properties of the samples can be avoided. Other advantages of Raman scattering are facile sample preparation, non-contact and non-destructive detection, fast analysis, in situ analyte identification, analysis through transparent containers and windows, and the development of commercially available, inexpensive, robust, and portable Raman spectrometers.

As previously mentioned, Raman spectroscopy offers several advantages over other analytical instruments. However, the most significant drawback of normal Raman spectroscopy is its inherently low sensitivity. The inelastic scattering of visible light focused on molecules is very weak, occurring in only one photon per ten million which makes this technique unsuitable for trace or biological analysis. Fortunately, the discovery of the surface-enhanced Raman scattering (SERS) effect offered the exciting possibility of overcoming this low sensitivity. The SERS technique involves the adsorption of analyte molecules onto a SERS substrate, which are either colloids of group 11 metals (Cu, Ag, Au) or their foils/wires with roughened metallic surfaces. Recently, numerous SERS-active substrates have been developed in the attempt to apply Raman spectroscopy to analyze trace or biological samples by exploiting the advantages of SERS. Among these, the most facile and popular method is the immobilization of Au and/or Ag nanoparticles in different shapes on solid supports, which provides a means to bring plasmonic nanoparticles close to one another and create "hot spots" to enhance the Raman signal. However, suitable SERS substrates are still difficult to find because of their low sensitivity, low spot-to-spot reproducibility, low stability, low shelf life, and high cost. To overcome these weaknesses, various methods for fabricating suitable nanostructures have been applied, such as chemical approaches, vapor deposition, electrochemical deposition, and lithography, to create uniform hot spots on different solid supports such as glass, quartz, metal, silicon wafer, aluminum oxide (AAO), and poly-dimethylsiloxane (PDMS). The substrates fabricated using these methods showed slight improvements in reproducibility and sensitivity. However, the fabrication of these substrates is expensive, complex, and time consuming and requires the use of sophisticated devices operated by professional personnel. In addition, conventional solid supports are difficult to modify, functionalize, and are ecologically unfriendly. Therefore, the application of these substrates in routine laboratory and on-site analyses for public safety and medical care is limited. Therefore, the development of extremely sensitive, low-cost, facile, and easily manufactured SERS substrates is still required.

Recently, researchers have focused on fabricating porous membrane-based SERS substrates as alternatives to conventional substrates. Porous membrane-based SERS substrates have several advantages, such as low cost, ease of modification or functionalization, easily controlled size and shape, flexibility, and high porosity. Frequently used porous membranes include cellulose (filter paper), nitrocellulose, poly (vinylidene fluoride) (PVDF), polycarbonate (PC), polyamide (nylon), polytetrafluoroethylene (PTFE), and polyethersulfone (PES). Among these, the filter paper is the most common porous membrane used as a SERS substrate because of its low price. However, because of the relatively large pore size of filter paper, it is difficult to retain nano-sized Ag or Au nanoparticles on the surface of the filter paper without aggregation of the nanoparticles. For these reasons, the SERS signals of filter paper-based SERS substrates tend to be very weak and have a large standard deviation. Several methods have been adopted to enhance the signal of filter paper-based SERS substrates, such as electrostatic adsorption, drop casting, thermal evaporation, in situ coating, light-induced photothermal deposition, immersion deposition, inkjet printing, screen printing, vapor deposition, spray coating, and brushing. However, these methods still face shortcomings such as the nonuniform distribution of nanoparticles, large spot-to-spot variation of SERS intensity, low sensitivity, requirement of complicated instruments and processes, and high cost of substrate fabrication.

Therefore, it is needed to develop a better SERS substrate used for SERS detection to overcome the above-mentioned drawbacks.

SUMMARY OF THE INVENTION

An object of the present invention is to provide a fabrication method of a SERS substrate with high sensitivity, high reproducibility, high stability, high shelf life, and low cost.

Another object of the present invention is to provide a SERS detection method using the improved SERS substrate fabricated in the present invention.

In accordance with an aspect of the present invention, there is provided a fabrication method of a SERS substrate, comprising: (a) preparing a hydrophilic membrane comprising 10~20 wt % poly(vinylidene fluoride) (PVDF), polytetrafluoroethylene (PTFE), polycarbonate (PC), polyethersulfone (PES), polyamide (nylon), or mixtures thereof, 10~20 wt % polyvinylpyrrolidone (PVP), and 0.2~4.6 wt % poly(methyl methacrylate) (PMMA), poly(2-hydroxyethyl methacrylate) (PHEMA), or mixtures thereof; (b) dipping the hydrophilic membrane in an alcohol; (c) immersing the hydrophilic membrane in a chloride ion aqueous solution; and (d) depositing Ag or Au nanoparticles on the hydrophilic membrane by suction filtration to form the SERS substrate.

In an embodiment, the molecular weight of PVDF, PTFE, PC, PES or nylon is ranged 1~40000 kDa, the molecular weight of PVP is ranged 1~40000 kDa, and the molecular weight of PMMA or PHEMA is ranged 1~10000 kDa.

In an embodiment, the alcohol is methanol, ethanol, propanol, isopropanol, C4 to C20 alcohols or mixtures thereof.

In an embodiment, the concentration of the chloride ion aqueous solution is ranged 0.1~10 M.

In an embodiment, the chloride ion is metal chloride aqueous solution, and the metal is selected from the group consisting of I A metals, II A metals, III B metals, transition metals and mixtures thereof.

In an embodiment, the Ag or Au nanoparticles are Ag or Au nanoparticles in different shapes.

In an embodiment, the Ag or Au nanoparticles are shaped as spheres, rods, triangles, cubes, cuboids, cylinders, wires, stars, flowers or mixtures thereof.

In an embodiment, sizes of the Ag or Au nanoparticles are ranged 1~4000 nm.

In an embodiment, aspect ratios of the Ag or Au nanoparticles shaped as rods are ranged 1~20.

In accordance with another aspect of the present invention, there is provided a SERS detection method comprising: providing a SERS substrate fabricated by the method described above; applying a sample to the SERS substrate; and collecting Raman spectra of the sample.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will be described more specifically with reference to the following embodiments. It is to be noted that the following descriptions of preferred embodiments of this invention are presented herein for purpose of illustration and description only. It is not intended to be exhaustive or to be limited to the precise form disclosed.

The present invention developed an extremely sensitive and ultra-low-priced hydrophilic membrane-based SERS substrate that can be easily prepared in laboratory and scaled-up in factory. It was found that a solvating pretreatment of the hydrophilic membrane effectively enhanced the SERS signal of the SERS substrate. During development, it was also found that the quality of the hydrophilic membrane would affect SERS signal and thus may not achieve the expected results. Therefore, the influence of the hydrophilic membrane components on the sensitivity of the SERS substrate was further studied.

Figure 1:
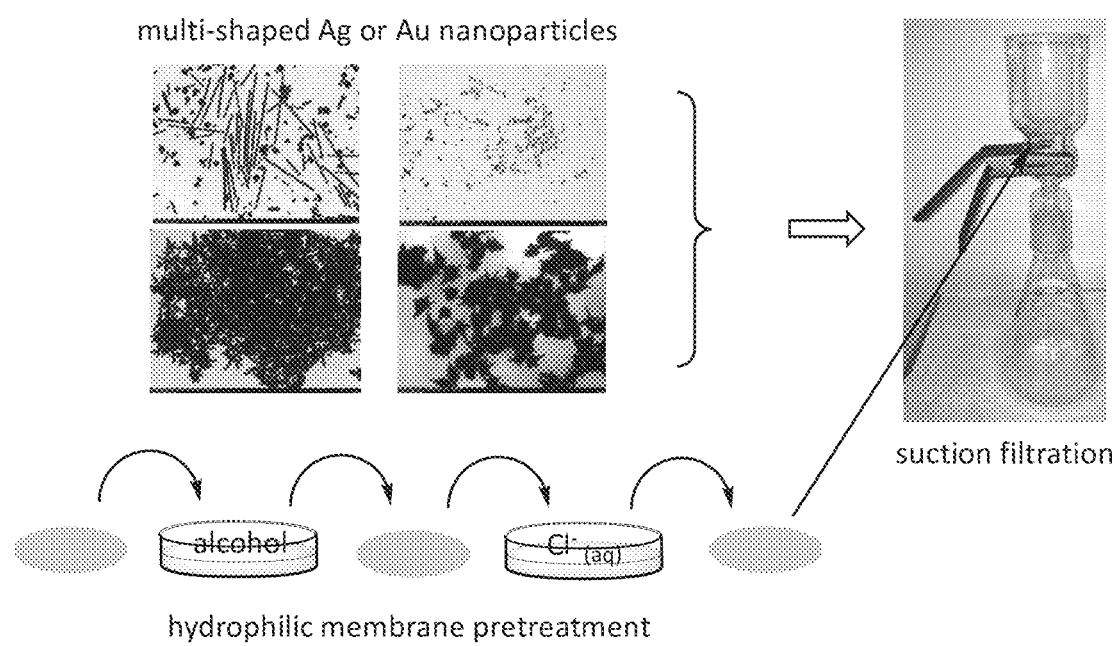
FIG. 1 shows the fabrication method of the SERS substrate.

FIG. 1 shows the fabrication method of the SERS substrate. The fabrication method mainly includes steps of preparing a hydrophilic membrane (Step S1), dipping the hydrophilic membrane in an alcohol (Step S2); immersing the hydrophilic membrane in a chloride ion aqueous solution (Step S3); and depositing Ag or Au nanoparticles on the hydrophilic membrane by suction filtration to form the SERS substrate (Step S4). The following embodiments will further illustrate the fabrication method of the SERS substrate in detail.

In the Step S1, a hydrophilic membrane is provided. The hydrophilic membrane is preferably a hydrophilic poly(vinylidene fluoride) (PVDF) membrane, and may also be a positively-charged PVDF membrane, a polytetrafluoroethylene (PTFE) membrane, a polycarbonate (PC) membrane, a polyethersulfone (PES) membrane, or a polyamide (nylon) membrane.

The hydrophilic modification of the hydrophobic membrane can be achieved by adding hydrophilic polymers or pore-forming additives, such as polyvinylpyrrolidone (PVP), polyethylene glycol (PEG), poly(methyl methacrylate) (PMMA) or poly(2-hydroxyethyl methacrylate) (PHEMA). This kind of blending modification works at the same time in the process of preparing the membrane. In other words, the additives are added during membrane preparation, and after the membrane is formed, the hydrophilic modification is completed and the formed membrane can be used in aqueous systems, e.g., aqueous Ag or Au colloid filtration.

In an embodiment, the hydrophilic membrane is prepared by including 10~20 wt % PVDF, PTFE, PC, PES, nylon, or mixtures thereof, 10~20 wt % PVP, and 0.2~4.6 wt % PMMA, PHEMA, or mixtures thereof.

In an embodiment, the molecular weight of PVDF, PTFE, PC, PES or nylon is ranged 1~40000 kDa, the molecular weight of PVP is ranged 1~40000 kDa, and the molecular weight of PMMA or PHEMA is ranged 1~10000 kDa.

For example, the hydrophilic membrane was prepared using a phase inversion technique. First, PVDF (10~20 wt %), PVP (10~20 wt %), and PMMA (0.2~1.6 wt %) were dispersed in the solvent N-Methyl-2-pyrrolidone (NMP) (59.2~79.8 wt %). The mixed dope solution was stirred at 70° C. for 12~24 hours until homogeneity. Later, the solution was left to stand until air bubbles were removed. Afterwards, an appropriate amount of the dope solution (e.g., 2.2 g) was dispersed uniformly onto a supporting material (e.g., glass plate) using spin coating at 800 rpm for 20 seconds. After that, the well dispersed solution was covered with a polyester non-woven fabric. After 30 seconds exposure to air, the cast membrane was promptly submerged into non-solvent at 25~60° C. for phase inversion, for example, at 60° C. 10 minutes and then 25° C. 5 minutes. Finally, the formed membrane was vacuum-dried or oven-dried at 60~80° C. for 1 hour. It was observed that the pore sizes of the formed membrane were ranged 0.1~0.45 μm on the surface attached to the supporting material during membrane preparation.

Subsequently, the formed hydrophilic membrane is subject to pretreatment by dipping the hydrophilic membrane in an alcohol (Step S2), and then immersing the hydrophilic membrane in a chloride ion aqueous solution (Step S3).

In an embodiment, the alcohol is methanol, ethanol, propanol, isopropanol, C4 to C20 alcohols or mixtures thereof.

In an embodiment, the concentration of the chloride ion aqueous solution is ranged 0.1~10 M, and preferably ranged 0.1~1 M.

In an embodiment, the chloride ion aqueous solution is metal chloride aqueous solution, and the metal is selected from the group consisting of I A metals, II A metals, III B metals, transition metals and mixtures thereof. For example, the chloride ion aqueous solution may be sodium chloride solution, lithium chloride solution, potassium chloride solution, magnesium chloride solution, zinc chloride solution or calcium chloride solution, but not limed thereto.

For example, the formed hydrophilic membrane was first wetted by dipping in pure alcohol (methanol, ethanol, propanol or isopropanol) for 10 minutes. The membrane was then washed twice with water and immersed in a sodium chloride solution (0.1~1 M) for 10 minutes.

Later in the Step S4, Ag or Au nanoparticles are deposited on the hydrophilic membrane by suction filtration, without the pre-aggregation of nanoparticles, to form the SERS substrate. In an embodiment, the Ag or Au nanoparticles may be in different shapes, such as spheres, rods, triangles, cubes, cuboids, cylinders, wires, stars, flowers or mixtures thereof, but not limited thereto. Preferably, multi-shaped Ag or Au nanoparticles are deposited on the hydrophilic membrane. In an embodiment, the sizes of the Ag or Au nanoparticles are ranged 1~1000 nm, and the aspect ratios of the Ag or Au nanoparticles shaped as rods are ranged 1~20, and preferably ranged 1~10.

Take Ag as an example for illustrating the synthesis of Ag or Au nanoparticles. The multi-shaped Ag nanoparticles (AgNPs) can be easily prepared by heating an aqueous mixture of sodium citrate and silver nitrate at 100° C. for 1 hour without the need for a seed-mediated process or specific reductant/additive. Briefly, 90 mg of $AgNO_3$ was dissolved in 500 mL of water in a flask, and the solution was brought to 100° C. on an oil bath under stirring. Then, 10 ml of 1% sodium citrate was added, and the solution was left at 100° C. for an additional 60 minutes. After completion of the reaction, the solution turned greenish-brown, indicating the formation of a silver colloid. UV-Vis spectrometry was conducted to measure the absorbance of the prepared AgNPs and the mixture was diluted with water to a predetermined concentration. The Ag colloid was transferred to a sealed container and could be stored up to one month in a refrigerator at 4~7° C. and even to several months under nitrogen atmosphere.

During deposition, the pretreated hydrophilic membrane (e.g., 25 mm diameter, 0.22 μm pore size) was placed into a filter holder with sintered glass, wherein the bottom side attached to the supporting material during membrane preparation is faced up. Then, different volumes of Ag colloid (e.g., 1~12 mL) were filtered through the hydrophilic membrane under vacuum. The filtration procedure was repeated several times until the filtrate became clear. Finally, the hydrophilic membrane was removed from the filter holder and stored in an electrical desiccator at room temperature until further use.

Figure 2A:
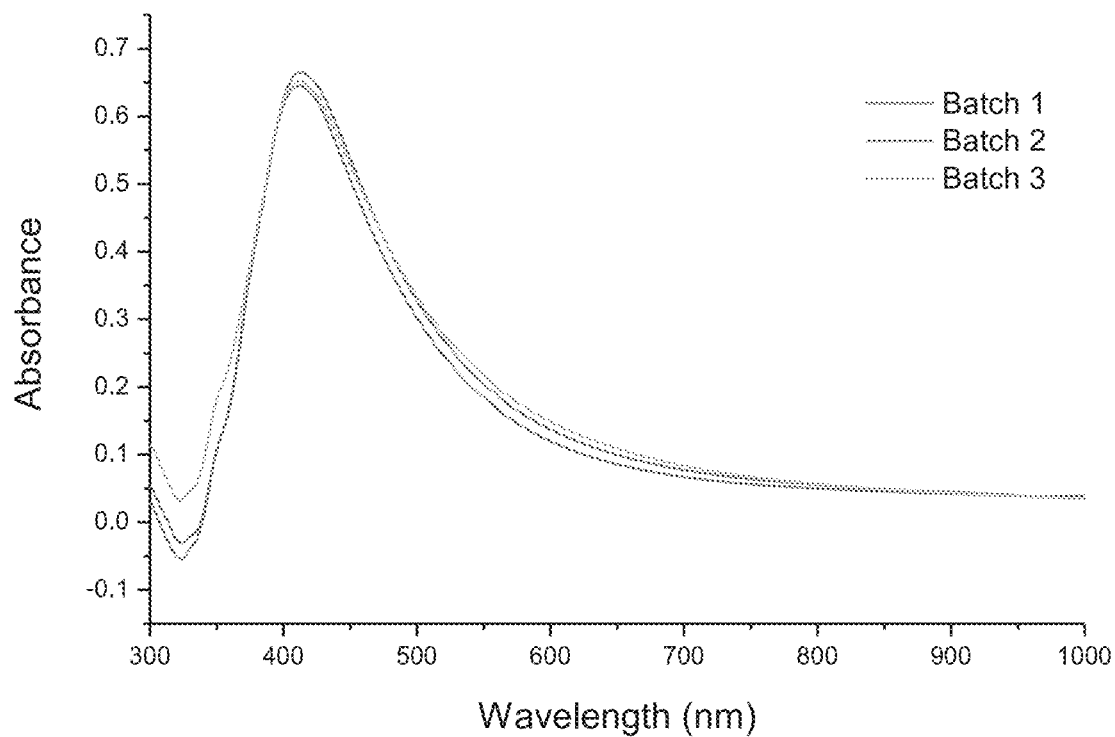
FIG. 2A shows the UV spectra of three synthetic batches of Ag colloid.
Figure 2B:
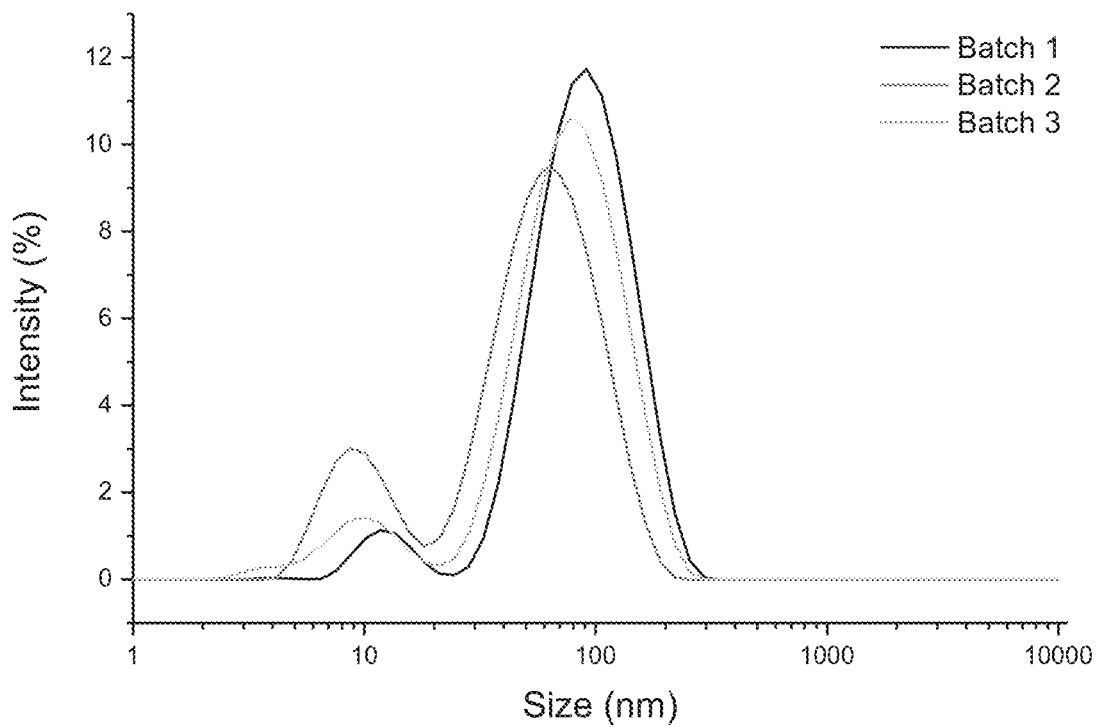
FIG. 2B shows the size distribution of the three batches of Ag colloid measured using dynamic light scattering (DLS)

FIG. 2A shows the UV spectra of three synthetic batches of Ag colloid, and FIG. 2B shows the size distribution of the three batches of Ag colloid measured using dynamic light scattering (DLS). As shown in FIGS. 2A and 2B, the three batches of Ag colloids showed similar UV spectra and peak distributions, which indicates consistency between different batches of synthesis. The UV spectra showed maximum absorption of surface plasmon resonance (SPR) peaks at 410 nm along with a tailing, which denotes that both spherical and other shaped AgNPs may be present within the Ag colloid. The mean hydrodynamic size (Z-average) measured by DLS was approximately 80 nm, and the intensity peak distributions indicated two groups of particle sizes.

Figure 3A:
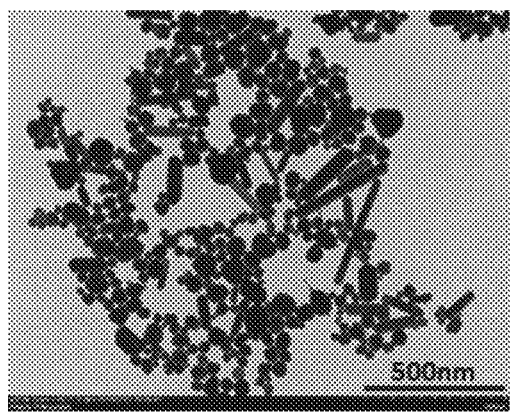
FIG. 3A shows the TEM image of the multi-shaped Ag colloid.
Figure 3B:
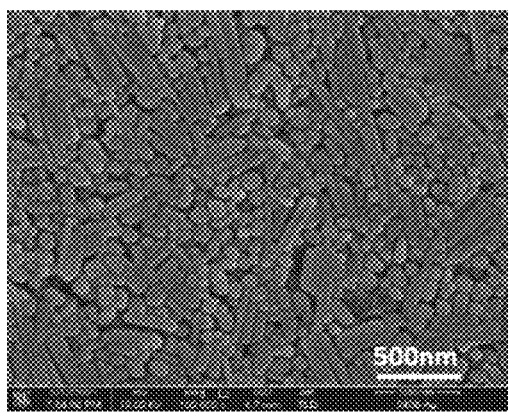
FIG. 3B shows the SEM image of the multi-shaped Ag colloid.

FIG. 3A shows the TEM image of the multi-shaped Ag colloid, and FIG. 3B shows the SEM image of the multi-shaped Ag colloid. From the TEM and SEM images, it was observed that several sphere-like (such as spheres, triangles, and cubes) and rod-like (with different diameters and aspect ratios) AgNPs were observed in the Ag colloid. This observation also explains the peak tailing in the UV spectra and the two sets of intensity distributions in the DLS spectrum.

Figure 3C:
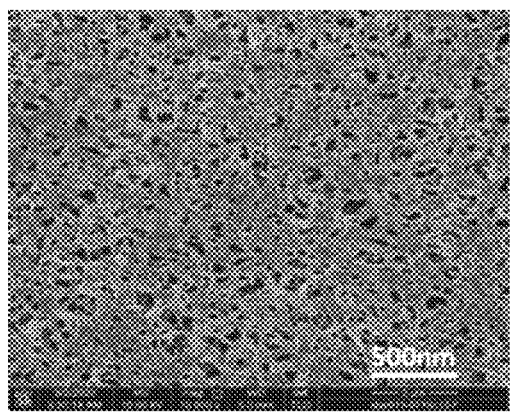
FIG. 3C shows the SEM image of the hydrophilic PVDF membrane on the surface attached to the supporting material during membrane preparation.
Figure 3D:
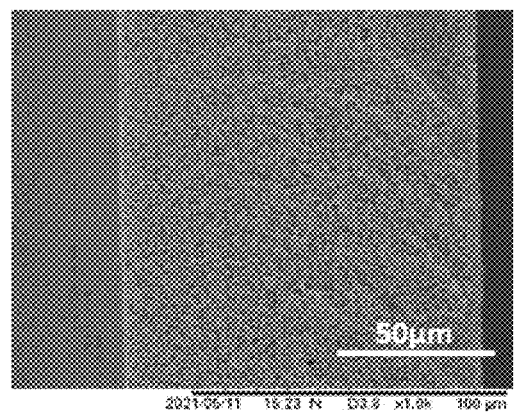
FIG. 3D shows the cross-section SEM image of the hydrophilic PVDF membrane.
Figure 3E:
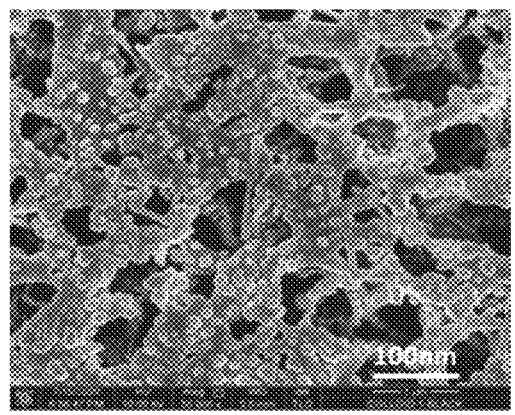
FIG. 3E shows the SEM image of the multi-shaped Ag colloid decorated on the hydrophilic PVDF membrane.

FIG. 3C shows the SEM image of the hydrophilic PVDF membrane on the surface attached to the supporting material (bottom side) during membrane preparation. FIG. 3D shows the cross-section SEM image of the hydrophilic PVDF membrane (upside in left). FIG. 3E shows the SEM image of the multi-shaped Ag colloid decorated on the hydrophilic PVDF membrane. FIG. 3C and FIG. 3E respectively show the SEM images of the hydrophilic PVDF membrane before and after the deposition of AgNPs on the bottom side. The morphology of the AgNPs decorated PVDF membrane revealed a high density of multi-shaped AgNPs uniformly dispersed on the surface of the PVDF fiber rather than the AgNPs clusters. Noticeably, SERS-active hot spots exist across the three-dimensional PVDF fiber, enabling a higher enhancement as compared to the conventional SERS substrate.

The shape and particle size of plasmonic metal nanoparticles (NPs) significantly affect the sensitivity of the Raman signal. Maximum enhancement in the local surface plasmon resonance (LSPR) on the metal NP surface is required for optimum application. Coupling of LSPRs with incident light results in a secondary electric field localized around the plasmonic nanostructures, generating plasmonic hotspots that strengthen the electromagnetic field at or near the surfaces of the metal NPs. Hotspots are located in the vicinity of the plasmonic nanostructures, where the local optical field is enhanced significantly compared with its surroundings. Consequently, molecules present in a SERS-active hotspot exhibit a massive enhancement in their Raman scattering signals. The LSPR of the metal NPs can be tuned by varying the size, shape, the distance between NPs. Recent developments in nanotechnology have enabled the design of metal NPs with regular shapes such as nanospheres, nanotriangles, nanocubes, nanocylinders, nanorods, nanowires, nanostars, nanoflowers, nanodendrites, and core-shell structures. The difference between the magnitude of the SERS response for these nanostructures is ascribed to the number of intrinsic hotspots per particle. Remarkably, the strength of electromagnetic fields can also be tuned by modulating the nanostructure morphology, dielectric functions, and interparticle plasmonic coupling to generate electromagnetic hotspots among neighboring particles. Generally, AgNPs are cheaper and provide a stronger enhancement compared to AuNPs; hence, they account for a higher percentage of SERS substrates. Nevertheless, the use of a mixture of differently shaped AgNPs decorated on a porous membrane as a SERS substrate has not yet been reported. The present invention demonstrates that using multi-shaped AgNPs as plasmonic nanostructures decorated on the surface of three-dimensional PVDF fibers can generate electromagnetic hotspots and increase the Raman cross-section. The present invention also predicts that the diverse hotspots created by multi-shaped AgNPs decorated on 3D structures may render this SERS substrate suitable for analyzing a wider variety of molecules.

After the AgNPs were deposited on the hydrophilic PVDF membrane, the SERS substrate was formed, and the SERS effect for analyte molecules onto the SERS substrate was further determined. The PVDF-based SERS substrate was first cut using scissors into dimensions of approximately 3×3 mm$^2$. Then, 3 µL of the sample to be analyzed was applied to the surface of the SERS substrate using a micropipette. The Raman spectra were collected using a Raman spectrometer before drying. SERS spectra were collected at a wavelength of 633 nm at a power of 17 mW for cumulative exposure times of 2 seconds or 10 seconds of 2 cycles for Rhodamine 6G (R6G). To decrease the measurement error, the SERS spectra were obtained from the mean of six independent spectra from randomly selected points on the same SERS substrate. Unless otherwise mentioned, 1 µM of R6G was selected as the standard solution to evaluate the SERS performance of the PVDF-based SERS substrate.

Since the quality of the hydrophilic membrane may affect SERS signal and thus cannot achieve the expected results, the present invention conducted research on the relationship between the membrane components and the SERS substrate sensitivity. Particularly, the ratios of PVDF, PVP and PMMA were changed during the hydrophilic membrane preparation, and the SERS signals of the formed SERS substrates were measured.

Figure 4A:
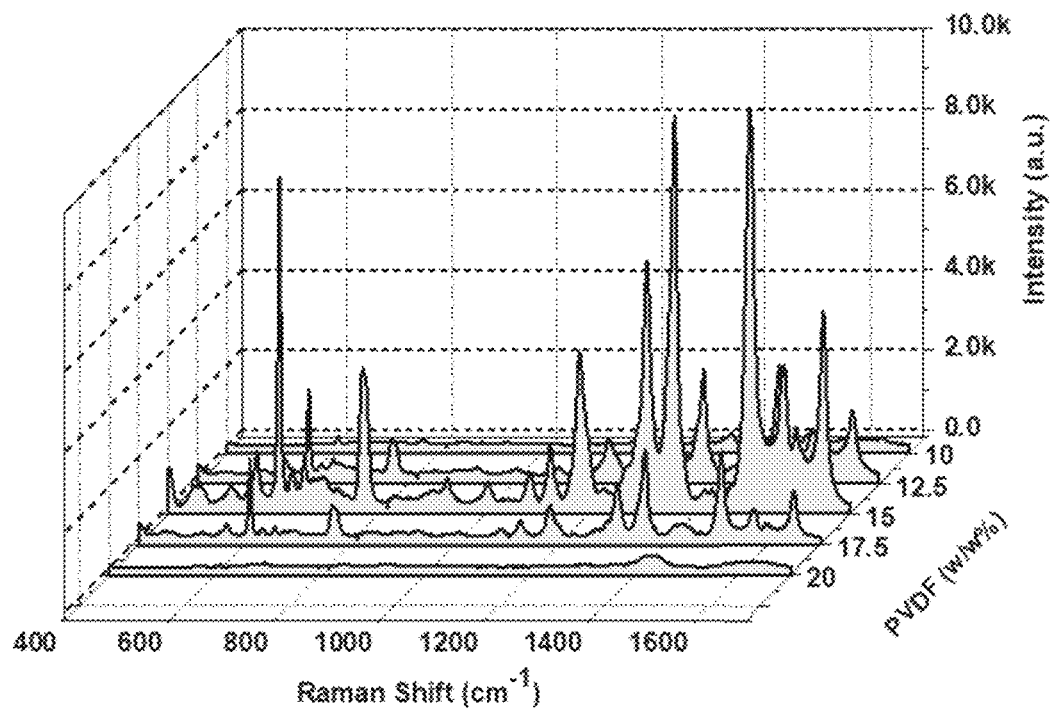
FIG. 4A shows the SERS spectra of R6G measured on the SERS substrates formed by the hydrophilic membranes with different weight ratios of PVDF.
Figure 4B:
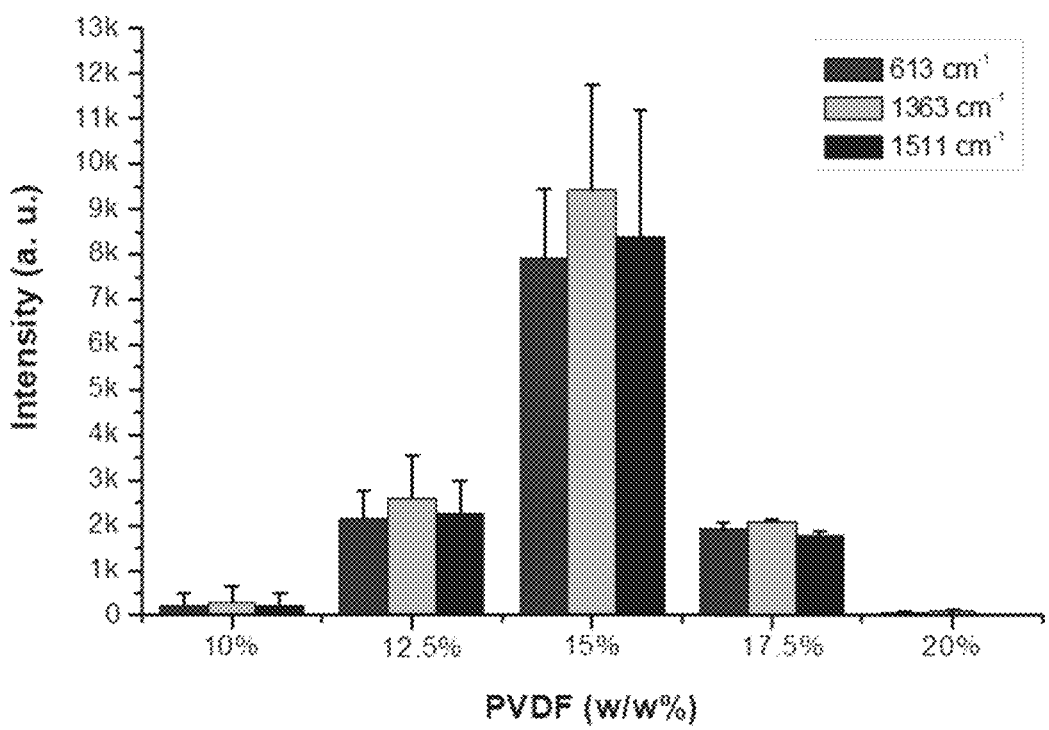
FIG. 4B shows the peak intensity of R6G at 613 $cm^{-1}$, 1363 $cm^{-1}$ and 1511 $cm^{-1}$ of the SERS spectra.

FIG. 4A shows the SERS spectra of R6G measured on the SERS substrates formed by the hydrophilic membranes with different weight ratios of PVDF, and FIG. 4B shows the peak intensity of R6G at 613 cm$^{-1}$, 1363 cm$^{-1}$ and 1511 cm$^{-1}$ of the SERS spectra. The preparation formula of the hydrophilic membranes was 10~20 wt % PVDF, 15 wt % PVP, and 0.4 wt % PMMA in NMP, and 0.1 µM of R6G was analyzed. The results showed that the signal intensity was enhanced when the concentration of PVDF was ranged 10~20 wt %, and the largest intensity enhancement exhibited at the concentration of 15 wt %.

Figure 5A:
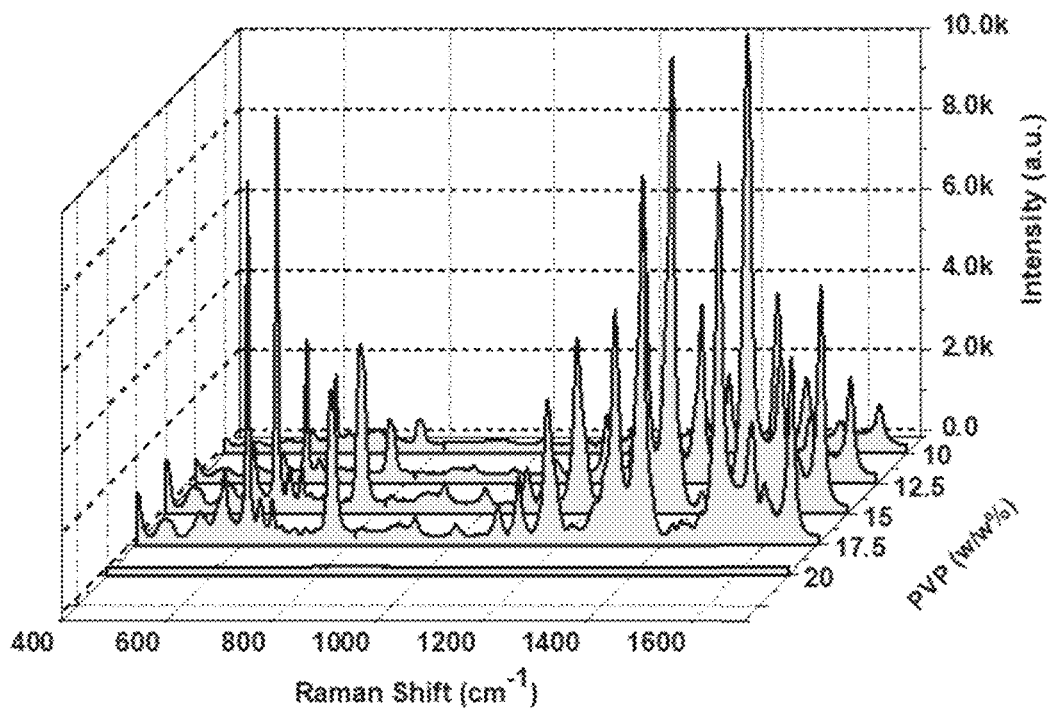
FIG. 5A shows the SERS spectra of R6G measured on the SERS substrates formed by the hydrophilic membranes with different weight ratios of PVP.
Figure 5B:
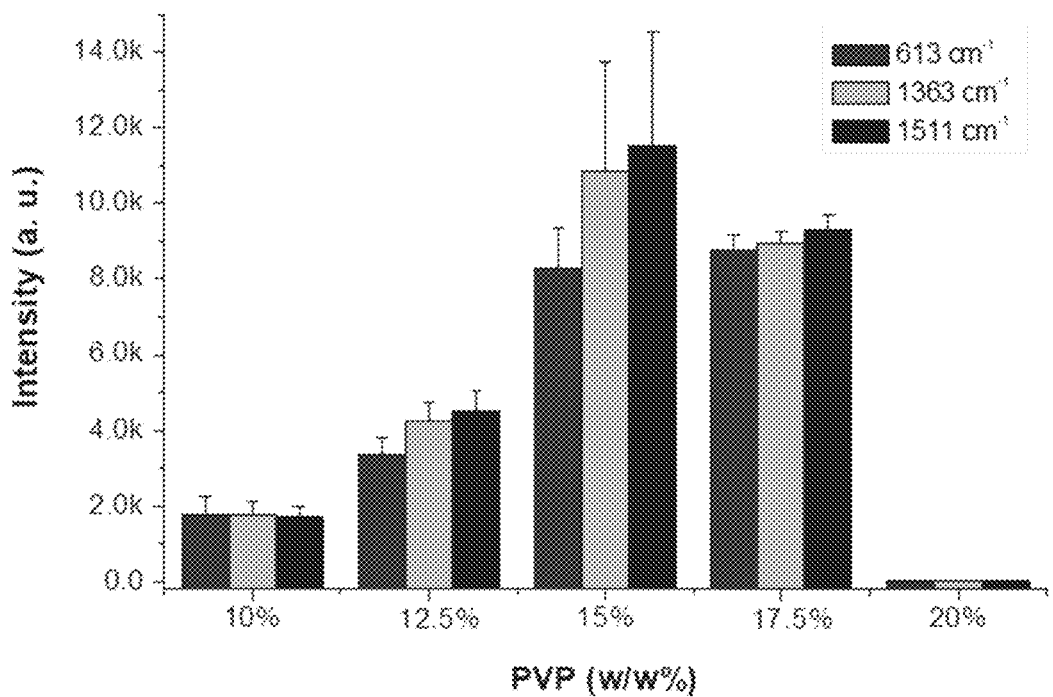
FIG. 5B shows the peak intensity of R6G at 613 $cm^{-1}$, 1363 $cm^{-1}$ and 1511 $cm^{-1}$ of the SERS spectra.

FIG. 5A shows the SERS spectra of R6G measured on the SERS substrates formed by the hydrophilic membranes with different weight ratios of PVP, and FIG. 5B shows the peak intensity of R6G at 613 cm$^{-1}$, 1363 cm$^{-1}$ and 1511 cm$^{-1}$ of the SERS spectra. The preparation formula of the hydrophilic membranes was 15 wt % PVDF, 10~20 wt % PVP, and 0.4 wt % PMMA in NMP, and 0.1 µM of R6G was analyzed. The results showed that the signal intensity was enhanced when the concentration of PVP was ranged 10~20 wt %, and the largest intensity enhancement exhibited at the concentration of 15 wt %.

Figure 6A:
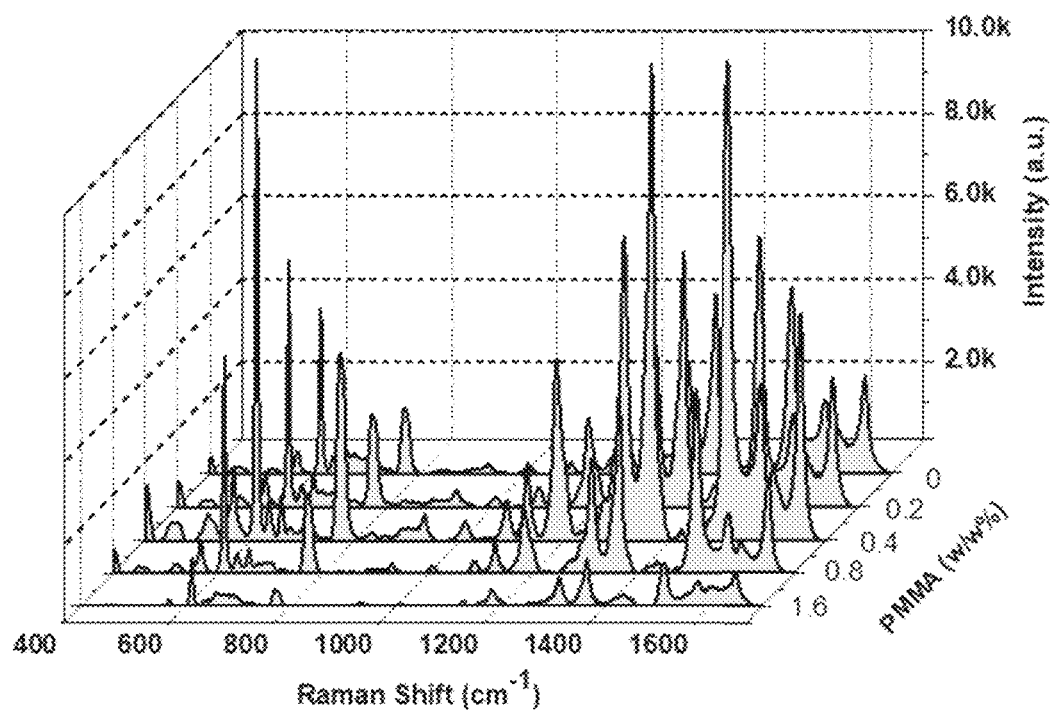
FIG. 6A shows the SERS spectra of R6G measured on the SERS substrates formed by the hydrophilic membranes with different weight ratios of PMMA.
Figure 6B:
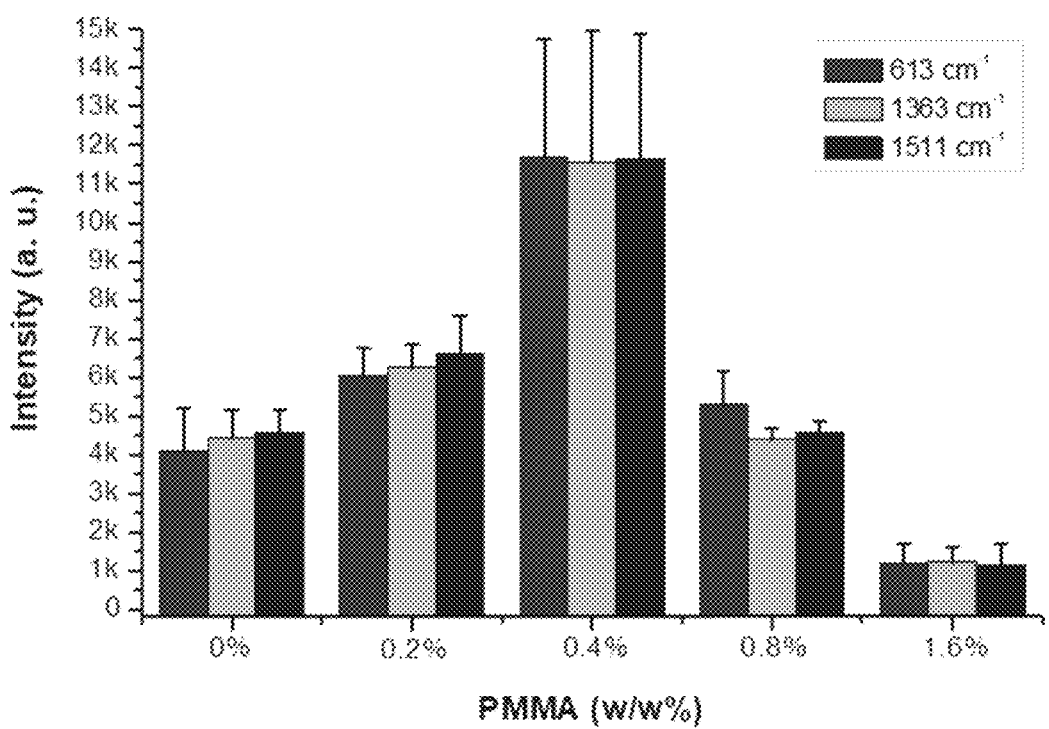
FIG. 6B shows the peak intensity of R6G at 613 $cm^{-1}$, 1363 $cm^{-1}$ and 1511 $cm^{-1}$ of the SERS spectra.

FIG. 6A shows the SERS spectra of R6G measured on the SERS substrates formed by the hydrophilic membranes with different weight ratios of PMMA, and FIG. 6B shows the peak intensity of R6G at 613 cm$^{-1}$, 1363 cm$^{-1}$ and 1511 cm$^{-1}$ of the SERS spectra. The preparation formula of the hydrophilic membranes was 15 wt % PVDF, 15 wt % PVP, and 0~1.6 wt % PMMA in NMP, and 0.1 µM of R6G was analyzed. The results showed that the signal intensity was further enhanced when the concentration of PMMA was ranged 0~1.6 wt %, particularly ranged 0.2~0.8 wt %, and the largest intensity enhancement exhibited at the concentration of 0.4 wt %.

From the above, it is clear that changes in the ratios of PVDF, PVP and PMMA have a great impact on the sensitivity of SERS substrates. The present invention has provided suitable membrane components to stabilize the supply of hydrophilic membranes and maintain the sensitivity of SERS substrates.

Further, to increase the performance of the hydrophilic membrane as the SERS solid support, it was found that the pretreatment of the membrane by dipping in the alcohol and the chloride ion aqueous solution before AgNP deposition dramatically enhanced the Raman signal intensity. To explore the best pretreatment conditions, different alcohols were surveyed and the concentration of sodium chloride (NaCl) aqueous solution was varied in the range 0.1~1 M. For example, in the following tests, the hydrophilic membranes were the hydrophilic PVDF membranes. 5 mL Ag colloid was deposited on the hydrophilic PVDF membrane, and 3 μL of 1 μM R6G was analyzed. The exposure time was 2 seconds, and the average of spots was 6.

Figure 7A:
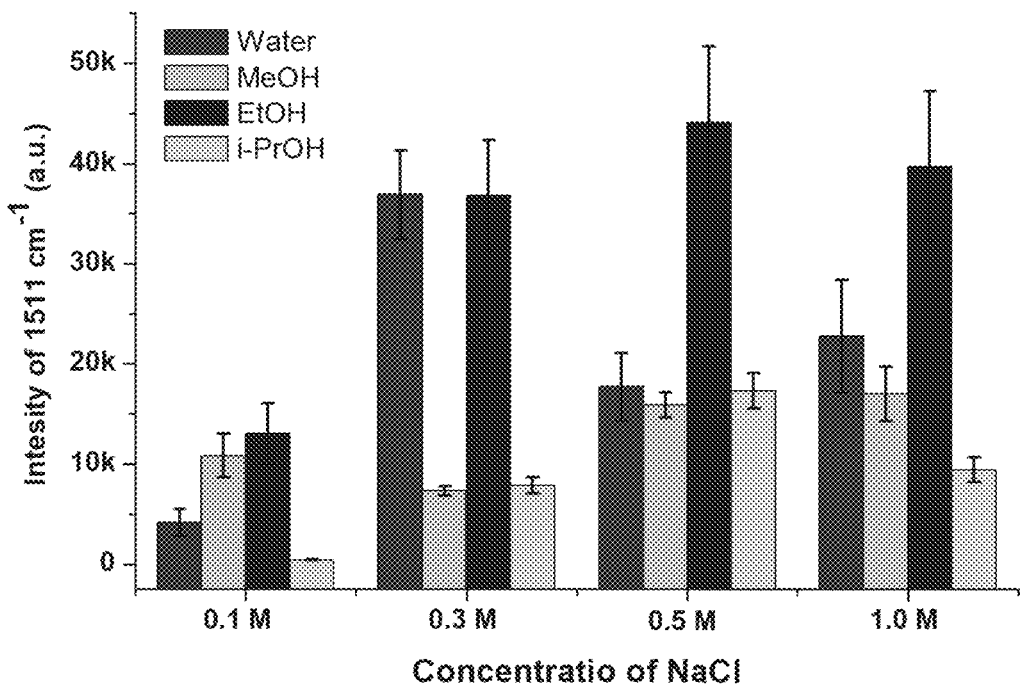
FIG. 7A shows the R6G intensity at 1511 $cm^{-1}$ measured on the PVDF-based SERS substrate pretreated with water, methanol, ethanol and isopropanol, and different NaCl concentrations.
Figure 7B:
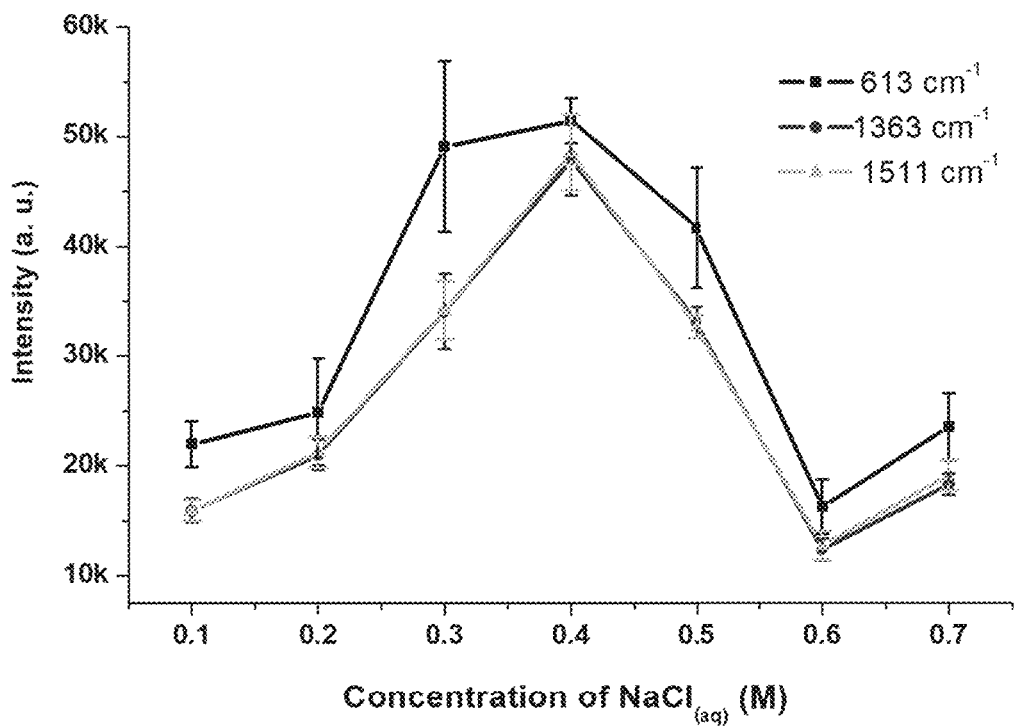
FIG. 7B shows the R6G intensity at 613 $cm^{-1}$, 1363 $cm^{-1}$ and 1511 $cm^{-1}$ measured on the PVDF-based SERS substrate with different NaCl concentrations after ethanol pretreatment.
Figure 7C:
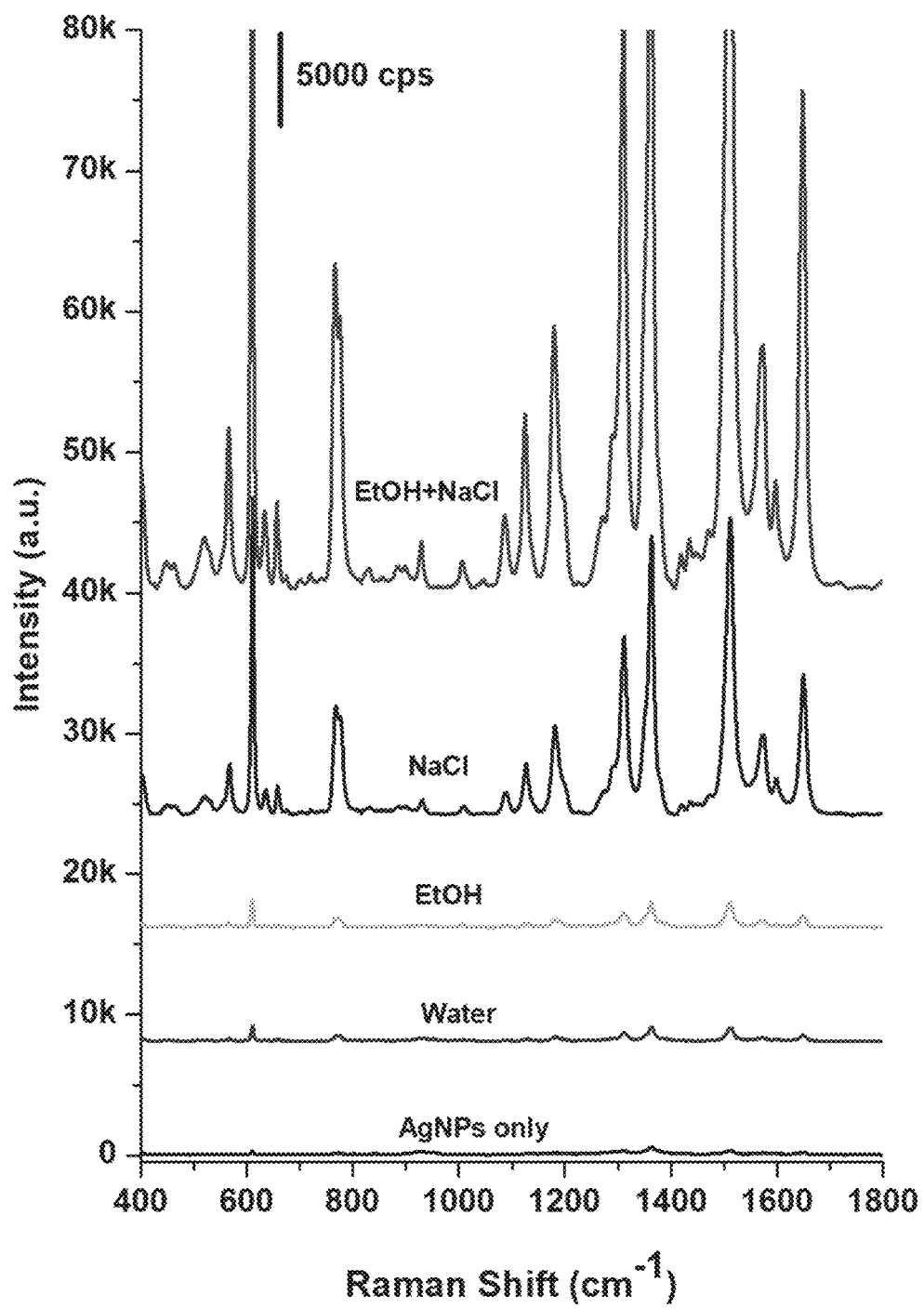
FIG. 7C shows the R6G intensity enhancement measured on the PVDF-based SERS substrate pretreated with water, ethanol, 0.4 M NaCl, ethanol plus 0.4 M NaCl or without pretreatment.

FIG. 7A shows the R6G intensity at 1511 $cm^{-1}$ measured on the PVDF-based SERS substrate pretreated with water, methanol, ethanol and isopropanol, and different NaCl concentrations. FIG. 7B shows the R6G intensity at 613 $cm^{-1}$, 1363 $cm^{-1}$ and 1511 $cm^{-1}$ measured on the PVDF-based SERS substrate with different NaCl concentrations after ethanol pretreatment. FIG. 7C shows the R6G intensity enhancement measured on the PVDF-based SERS substrate pretreated with water, ethanol, 0.4 M NaCl, ethanol plus 0.4 M NaCl or without pretreatment. The results showed that the use of ethanol led to the largest intensity enhancement of 1363 $cm^{-1}$ at all NaCl concentrations when 1 μM of R6G was analyzed. Furthermore, the concentration of NaCl substantially affected the signal intensity of R6G. The three main peaks of R6G, as shown in FIG. 7B, exhibited the highest enhancement in signal intensity when the membrane was pretreated with ethanol followed by 0.4 M NaCl aqueous solution. Table 1 shows the fold change in the peak intensity of R6G at 613 $cm^{-1}$, 1363 $cm^{-1}$, and 1511 $cm^{-1}$, measured on the PVDF-based SERS substrate with different solvating pretreatments. As shown in FIG. 7C and Table 1, the combined effect of ethanol and 0.4 M NaCl resulted in a 100~188-fold enhancement in the signal intensity of R6G compared to that with no pretreatment. The ethanol and 0.4 M NaCl individually at 613 $cm^{-1}$ led to only 6.6-fold and 66.4-fold enhancement, respectively.

deposition of the AgNPs on the surface of the porous membrane. This is particularly important in the present detection method because the SERS signal is measured in a wet droplet; thus, only the AgNPs close to the contact face of the sample droplet will boost the SERS signal intensity. Moreover, it was observed that the filtrate of the Ag colloid was clearer when the PVDF membrane was pretreated with aqueous NaCl, proving that NaCl hastens the deposition of the AgNPs. The SEM image of the AgNP-decorated PVDF membrane also demonstrated that a high density of AgNPs was uniformly deposited on the surface of the PVDF fiber (as shown in FIG. 3F). Besides, in the proposed fabrication and detection method, AgNP colloids could be deposited on the PVDF membrane within 1 minute by suction filtration and the Raman signal could be measured immediately after dropping the sample solution on the SERS substrate. Thus, both the substrate fabrication time and the SERS detection time are shortened, and the applicability of the SERS substrate is further improved.

Further, the amount of AgNPs deposited on the surface of the PVDF membrane should have a considerable influence on the SERS effect. Thus, the present invention explored the dependence of the R6G signal intensity on the volume of the Ag colloid used during the filtration. AgNPs colloids with a constant concentration (e.g., extinction coefficient=0.7 at 410 nm of UV-Vis spectra) were deposited on the surface of the PVDF membrane by suction filtration. The filtrate became clear after two filtrations, so no AgNPs were wasted during the deposition process.

Figure 8A:
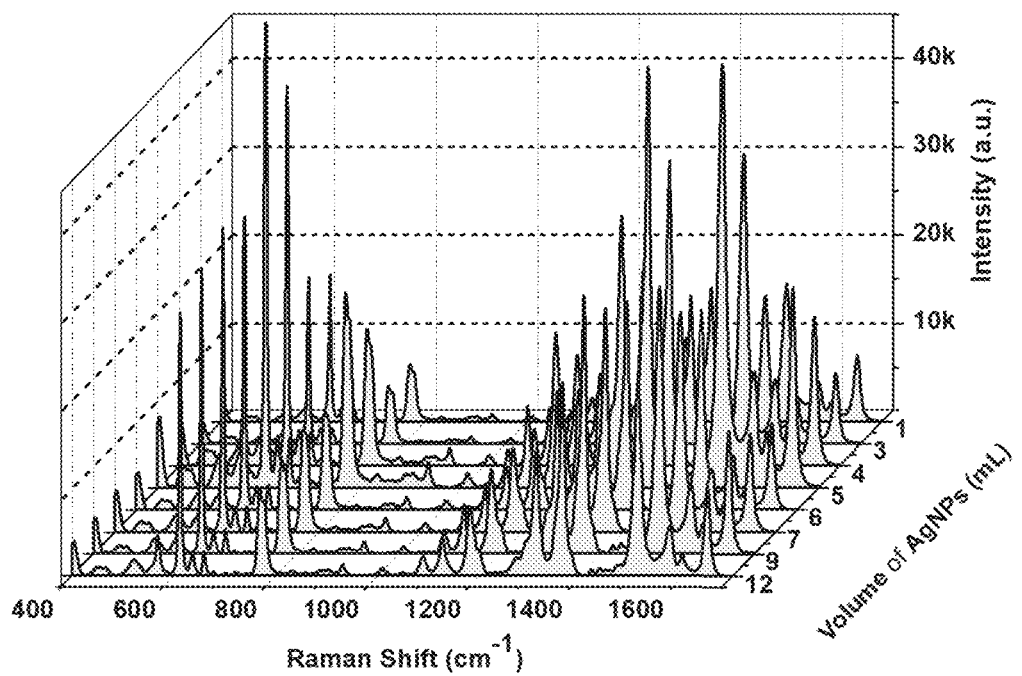
FIG. 8A shows the SERS spectra of R6G collected with different applied volumes of AgNPs.
Figure 8B:
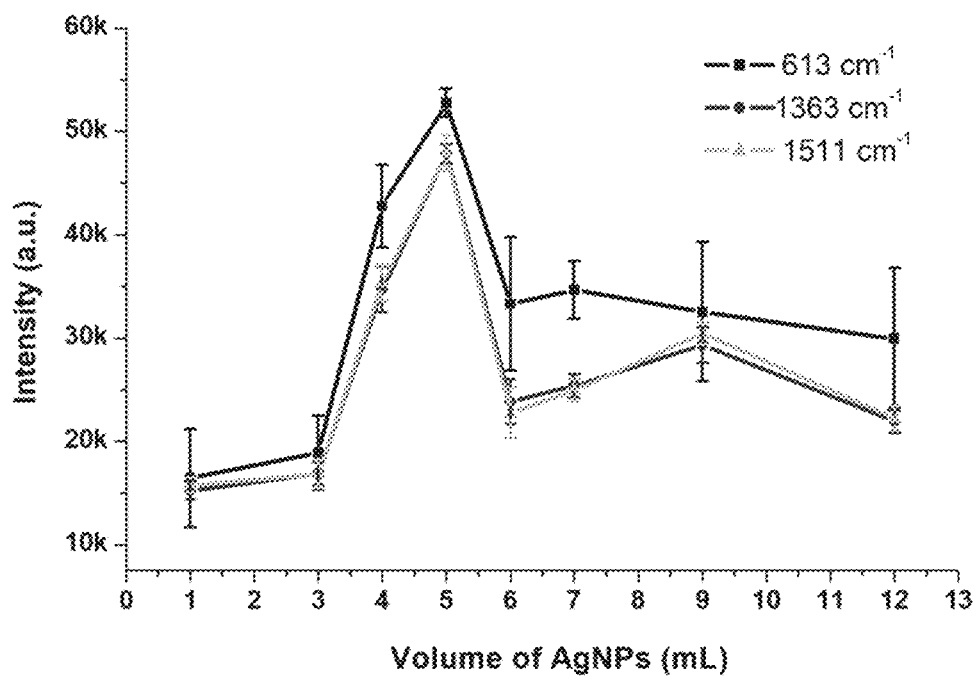
FIG. 8B shows the corresponding histogram for the peak intensity at 613 $cm^{-1}$, 1363 $cm^{-1}$ and 1511 $cm^{-1}$.

FIG. 8A shows the SERS spectra of R6G collected with different applied volumes of AgNPs, and FIG. 8B shows the corresponding histogram for the peak intensity at 613 $cm^{-1}$, 1363 $cm^{-1}$ and 1511 $cm^{-1}$. The PVDF membrane was pretreated with ethanol and 0.4 M NaCl aqueous solution, and 3 μL of 1 μM R6G was analyzed. The exposure time was 2 seconds, and the average of spots was 6. As shown in FIG. 8A and FIG. 8B, the strongest SERS intensity of the three main peaks of R6G was observed when the applied volume of the Ag colloid was 5 mL. As the volume of the Ag colloid increased from 1 mL to 5 mL, the SERS signal intensity increased to a maximum, and when the volume was larger than 5 mL, the signal intensity decreased substantially. This

TABLE 1

| | Intensity (a.u.) | | | | | |
|---|---|---|---|---|---|---|
| Pretreatment | 613 $cm^{-1}$ | Fold change | 1363 $cm^{-1}$ | Fold change | 1511 $cm^{-1}$ | Fold change |
| None | 302 ± 109 | 1.0 | 564 ± 86 | 1.0 | 314 ± 98 | 1.0 |
| Water | 1142 ± 271 | 3.8 | 1072 ± 105 | 1.9 | 912 ± 113 | 2.9 |
| EtOH | 1987 ± 186 | 6.6 | 1826 ± 201 | 3.2 | 1696 ± 226 | 5.4 |
| $NaCl_{aq}$ | 20065 ± 3686 | 66.4 | 18660 ± 2404 | 33.1 | 20801 ± 2521 | 66.3 |
| $NaCl_{aq}$ + EtOH | 55779 ± 1498 | 184.7 | 56505 ± 552 | 100.2 | 58997 ± 469 | 188.2 |

*Sample: 3 μL of 1 μM R6G; silver colloid volume = 5 mL; exposure time = 2 s; average number of spots = 6.

Therefore, the present invention reported for the first time that soaking in both alcohol solvent and chloride ion aqueous solution can greatly enhance the SERS signal intensity when a porous membrane is used as a SERS solid support. It is supposed that soaking the PVDF membrane with ethanol initially cleans the fibers and washes out the residue to reduce the background of the SERS substrate, after which the fibers swell and soften, increasing the uniformity of AgNP deposition. At the same time, the pore size reduces, helping the membrane retain nano-sized silver particles. The purpose of soaking in NaCl aqueous solution is to assist the phenomenon is due to the fact that as the amount of AgNPs increased, the distance between the AgNPs decreased, and it is believed that the gap between adjacent AgNPs at the hotspots decreased. In contrast, when the applied volume was larger than 5 mL, multilayer Ag films were formed which destroyed the plasmonic nanostructure of the hotspots on the surface of the SERS substrate.

Figure 9A:
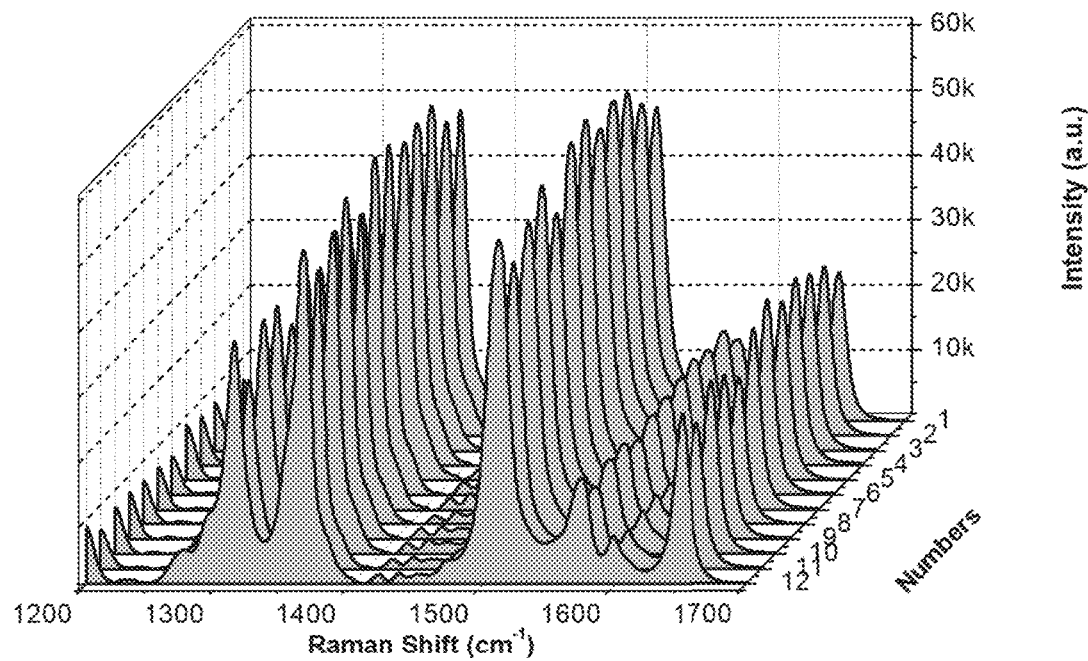
FIG. 9A shows the SERS spectra of R6G from 12 random parts of three batches of SERS substrates.
Figure 9B:
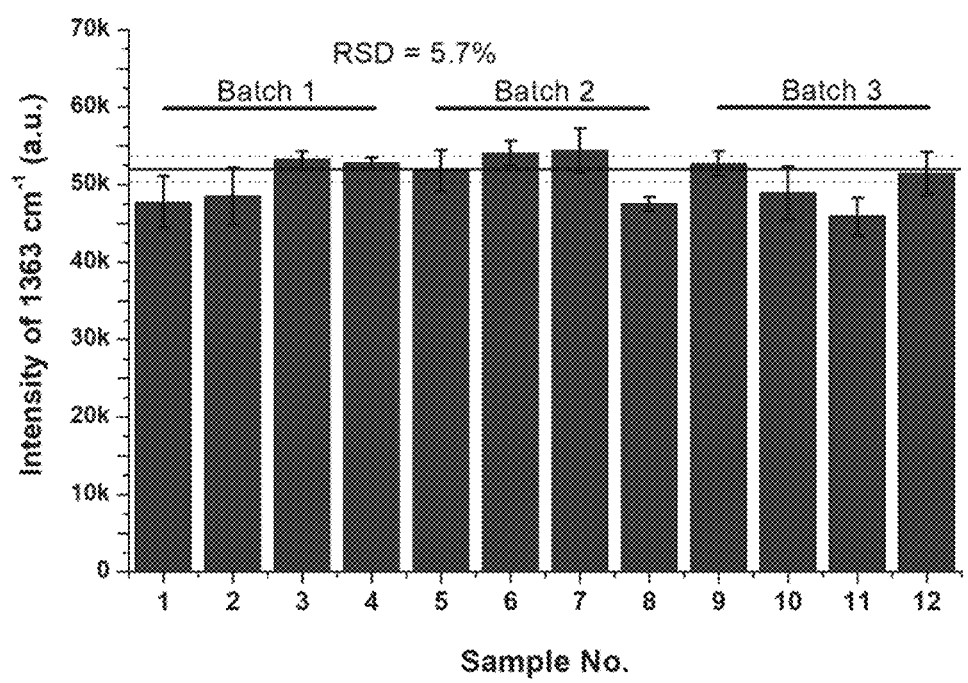
FIG. 9B shows the corresponding histogram of the peak intensity distribution at 1363 $cm^{-1}$ of R6G.

The reproducibility of the SERS substrate is another important parameter for evaluating the practicability of SERS sensors. To measure the reproducibility of the PVDF-based SERS substrate, the spot-to-spot and batch-to-batch variation of SERS intensity was quantified at 1363 cm$^{-1}$ for R6G. FIG. 9A shows the SERS spectra of R6G from 12 random parts of three batches of SERS substrates, and FIG. 9B shows the corresponding histogram of the peak intensity distribution at 1363 cm$^{-1}$ of R6G. The PVDF membrane was pretreated with ethanol and 0.4 M NaCl aqueous solution, 5 mL Ag colloid was deposited on the PVDF membrane, and 3 µL of 1 µM R6G was analyzed. The exposure time was 2 seconds, and the average of spots was 6. The relative standard deviation (RSD) of the SERS intensity was calculated to be 5.7% and confirmed that the PVDF-based SERS substrate functioned as a highly reproducible SERS sensor. The high reproducibility may be attributed to the suction filtration of AgNP colloids employed during fabrication instead of the syringe filtration of AgNP aggregates, which results in the uniform distribution of AgNPs on the membrane surface rather than AgNPs clusters.

Figure 10A:
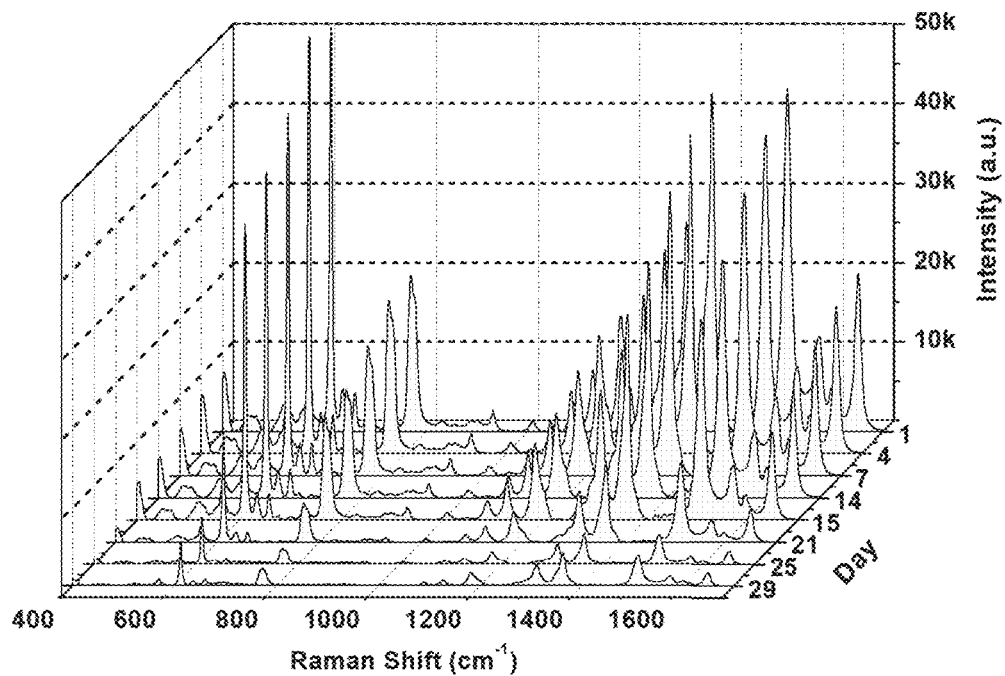
FIG. 10A shows the SERS spectra of R6G recorded using PVDF-based SERS substrate within 30 days.
Figure 10B:
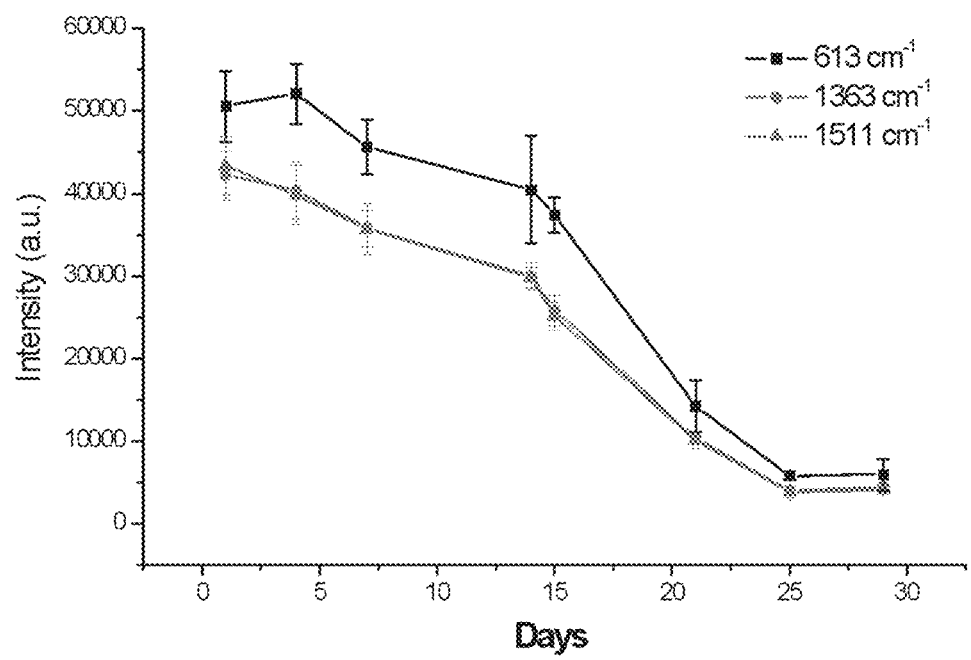
FIG. 10B shows the peak intensity at 613 $cm^{-1}$, 1363 $cm^{-1}$ and 1511 $cm^{-1}$ of R6G within 30 days.

The present invention also investigated the stability of the PVDF-based SERS substrate. The SERS substrate was stored in air at room temperature, and SERS experiments were conducted under the same operating conditions. FIG. 10A shows the SERS spectra of R6G recorded using PVDF-based SERS substrate within 30 days, and FIG. 10B shows the peak intensity at 613 cm$^{-1}$, 1363 cm$^{-1}$ and 1511 cm$^{-1}$ of R6G within 30 days. The PVDF membrane was pretreated with ethanol and 0.4 M NaCl aqueous solution, 5 mL Ag colloid was deposited on the PVDF membrane, and 3 µL of 1 µM R6G was analyzed. The exposure time was 2 seconds, and the average of spots was 6. The SERS spectra of R6G were collected over 30 days, and the peak intensities of the three main peaks of R6G were plotted against the number of days. As shown in FIG. 10A and FIG. 10B, in the first week, the SERS intensities at 613 cm$^{-1}$, 1363 cm$^{-1}$, and 1511 cm$^{-1}$ of R6G were reasonably maintained with up to a 10% decrease in intensity compared with that of the freshly prepared SERS substrate. Over a week, the signal intensities gradually weakened to approximately 10% of the original intensity. Although AgNPs are more sensitive and cheaper than AuNPs, their major disadvantage is poor stability because naked AgNPs are more easily oxidized to Ag$_2$O in air. It is believed that the presence of chloride ions from the pretreatment process may form strong Ag—Cl bonds and protect AgNPs from oxidation by air, and thus can prolong the shelf life of the SERS substrate for commercial use when stored in the dark and under N$_2$.

Figure 11A:
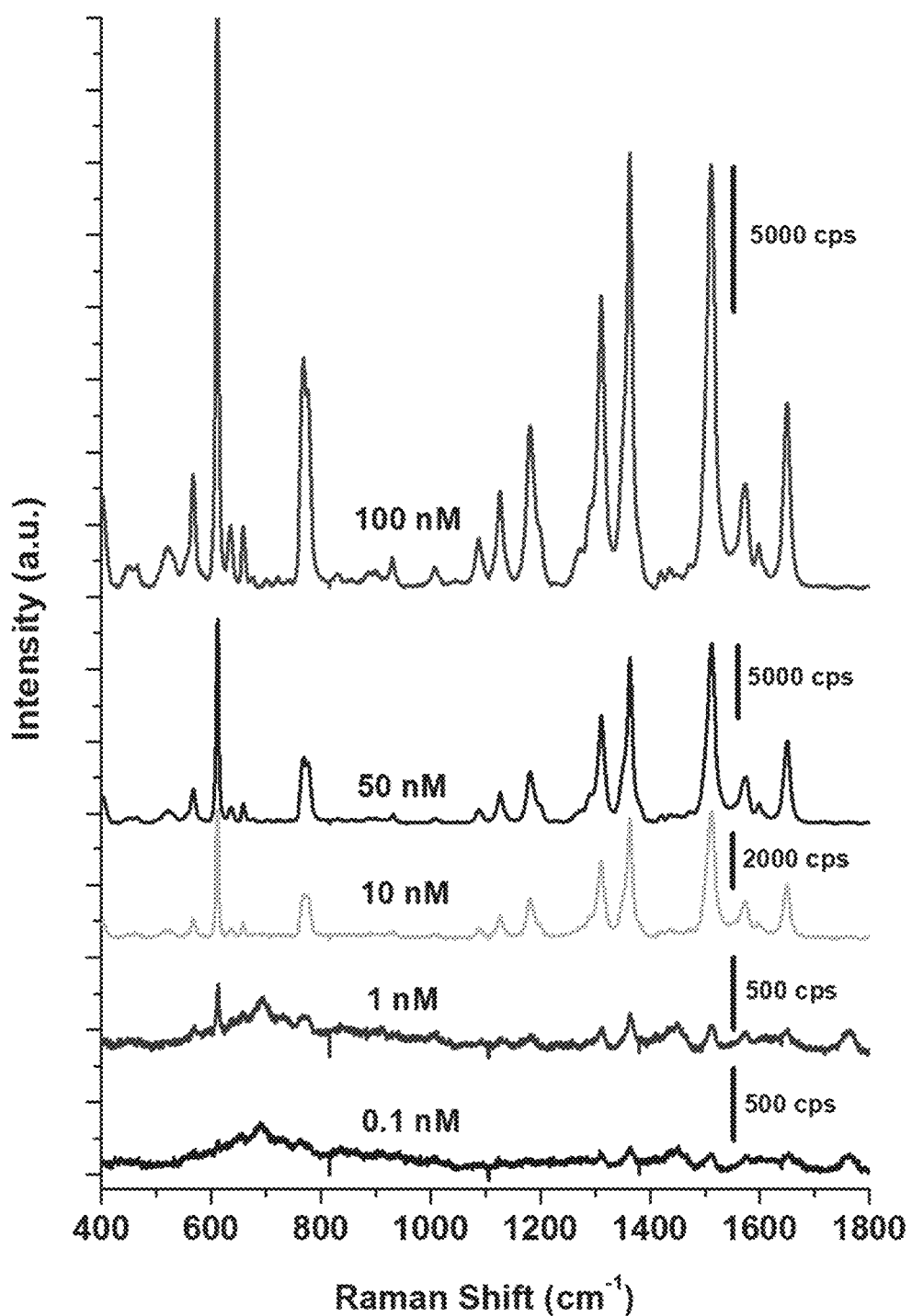
FIG. 11A shows the concentration-dependent SERS spectra of R6G.
Figure 11B:
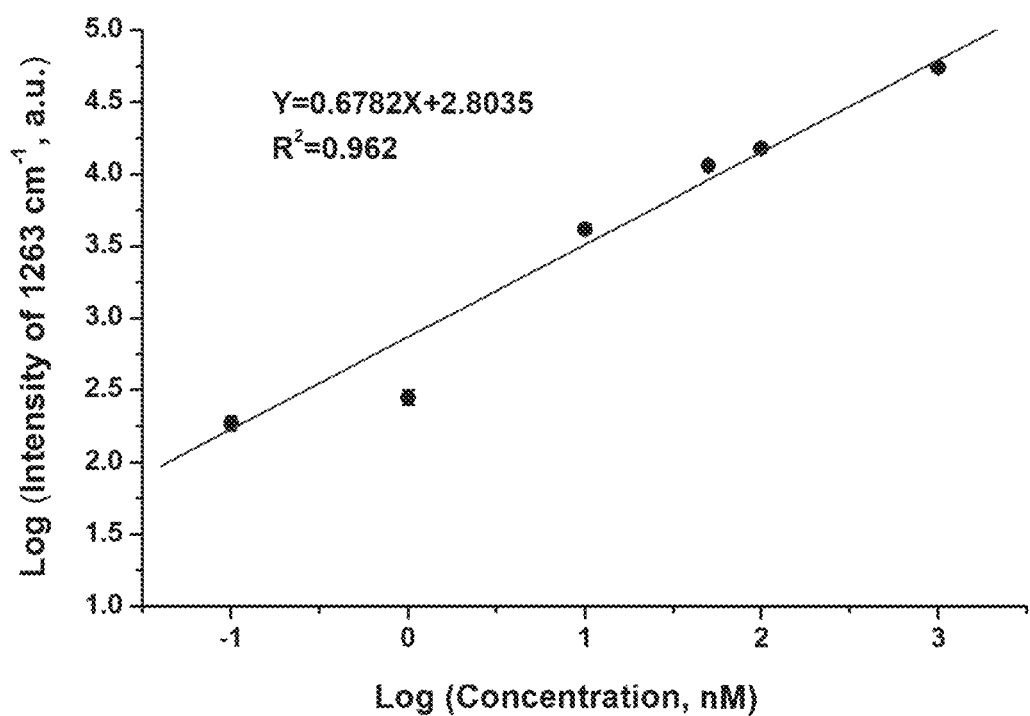
FIG. 11B shows the linear plot of logarithmic signal intensity at 1363 $cm^{-1}$ as a function of logarithmic R6G concentration.

To further evaluate the sensitivity of the PVDF-based SERS substrate, the present invention collected the SERS spectra of 3 µL R6G dropped on a 3 mm×3 mm SERS substrate at concentrations ranged from 0.1 nM to 100 nM and measured the intensities at 1363 cm$^{-1}$. FIG. 11A shows the concentration-dependent SERS spectra of R6G, and FIG. 11B shows the linear plot of logarithmic signal intensity at 1363 cm$^{-1}$ as a function of logarithmic R6G concentration. As shown in FIG. 11A, the intensity of the SERS peak of R6G decreased with a decrease in the concentration of R6G. The limit of detection (LOD) of R6G achieved using the present multi-shaped AgNP-decorated PVDF-based SERS substrate was 0.1 nM. Meanwhile, as shown in FIG. 11B, a linear correlation was observed in the log-log plot of intensity vs concentration in the corresponding concentration range with a correlation coefficient (R2) of 0.962. Here, the exposure time used for detection was 10 seconds, and the overall time required for the measurement of each SERS spectrum (400-1800 cm$^{-1}$) was less than 1 min. Undoubtedly, the LOD of R6G can be lowered further if a longer exposure time is used. The enhancement factor (EF) for R6G at 1363 cm$^{-1}$ was 8.58×10$^7$.

Yu & White (A simple filter-based approach to surface enhanced Raman spectroscopy for trace chemical detection. Analyst 2012, 137, 1168-1173) demonstrated a simple and practical SERS technique for trace chemical detection, wherein they trapped AgNP aggregates and concentrated 8 mL of the analyzed sample on a 13 mm diameter PVDF membrane by syringe filtration. They reported an LOD of 10 nM for R6G detection using their SERS substrate. While in the present invention, the multi-shaped AgNP-decorated PVDF-based SERS substrate demonstrated subnanomolar (0.1 nM) sensitivity to R6G using 3 µL of the aqueous sample on a 9 mm$^2$ SERS substrate within a detection time of 1 minute and with no concentration or drying processes. Consequently, the present invention decreased the LOD of R6G from 10 nM to 0.1 nM, lowered the area of the SERS substrate from 524 mm$^2$ (3.14×13×13) to 9 mm$^2$ (3×3), and reduced the number of analyte molecules that could be detected from 4.8×10$^{13}$ molecules [(8×10$^{-3}$ L)×(1×10$^{-8}$ M)× (6×10$^{23}$)] to 1.8×10$^6$ molecules [(3×10$^{-6}$ L)×(1×10$^{-10}$ M)× (6×10$^{23}$)]. The major factor causing the large difference in sensitivity between the two PVDF-based SERS substrates is that only approximately 20% of the membrane surface was covered by silver nanoclusters using syringe filtration in previous publications and patents.

Figure 12A:
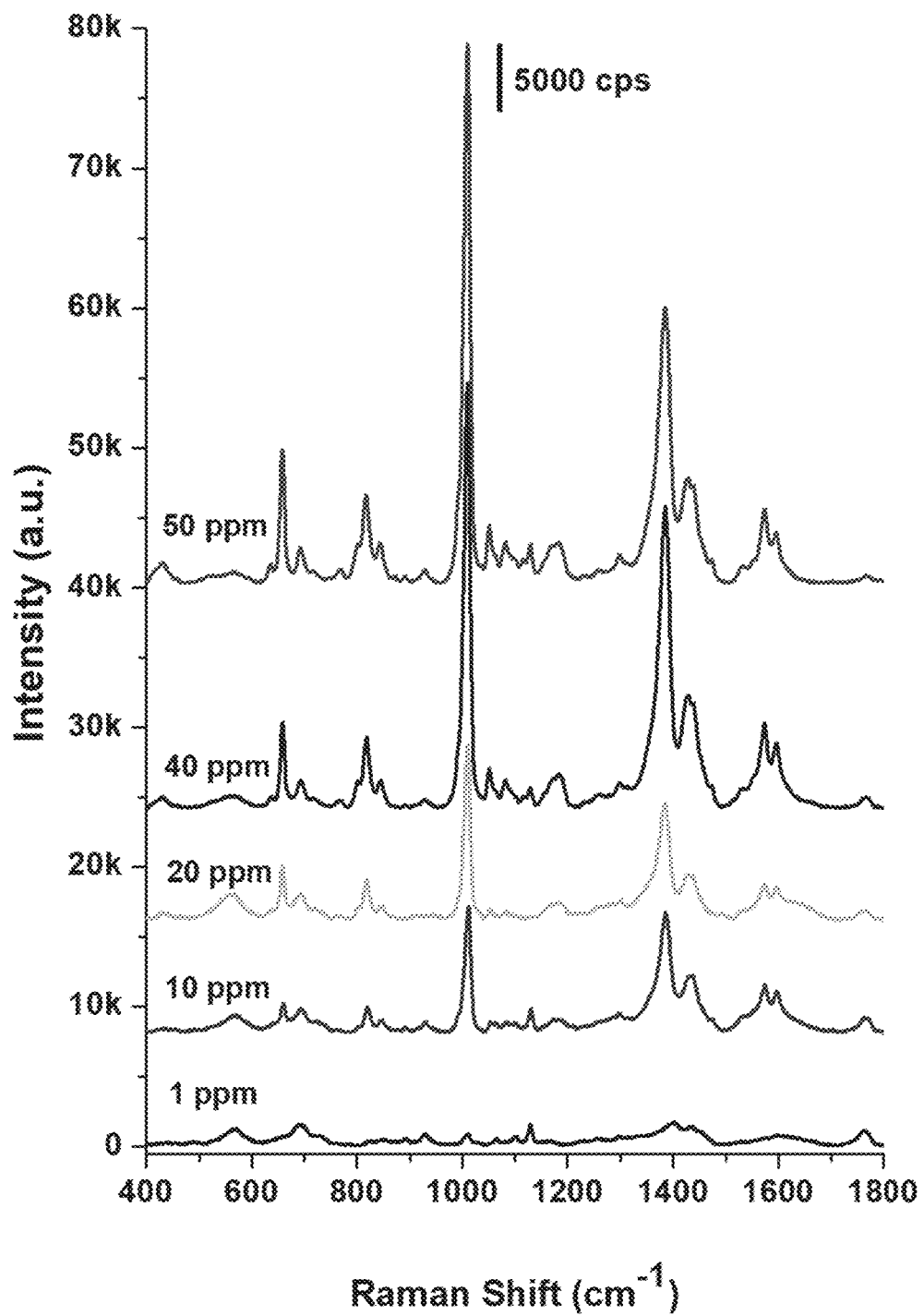
FIG. 12A shows the concentration-dependent SERS spectra of DPA, wherein the DPA concentration is ranged from 1 ppm to 50 ppm.
Figure 12B:
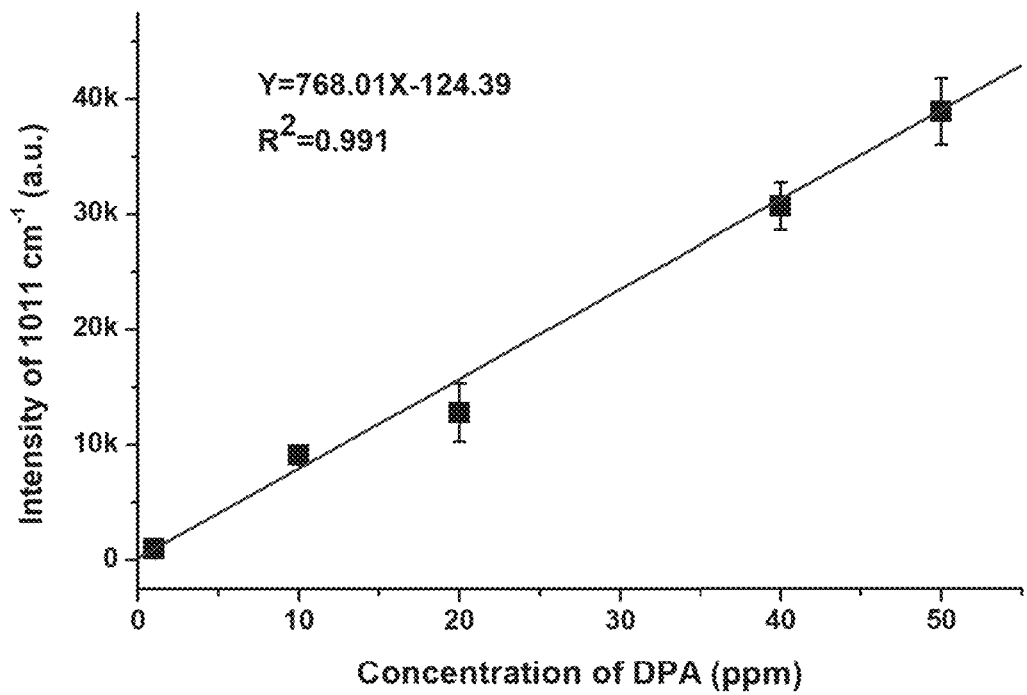
FIG. 12B shows the linear plot of signal intensity at 1011 $cm^{-1}$ as a function of DPA concentration.

To demonstrate the feasibility of the developed SERS substrate as a SERS sensor for bacterial spore detection, it was applied for the detection of dipicolinic acid (DPA) as a representative biomarker. DPA is a suitable biomarker for *Bacillus subtilis* (an extremely dangerous bioterrorism agent) because up to 17% of the dry weight of spores is made up of calcium dipicolinate. FIG. 12A shows the concentration-dependent SERS spectra of DPA, wherein the DPA concentration is ranged from 1 ppm to 50 ppm, and FIG. 12B shows the linear plot of signal intensity at 1011 cm$^{-1}$ as a function of DPA concentration. In the test, the exposure time was 10 seconds, and the average of spots was 6. As shown in FIG. 12A, the SERS peak intensities of DPA decreased as the concentration of DPA decreased, and the LOD was 1 ppm. Meanwhile, as displayed in FIG. 12B, a linear correlation can be found in the plot for the corresponding concentration range, with a correlation coefficient (R2) of 0.991.

However, in SERS detection of real bacterial spores, DPA must be extracted from spores and brought into contact with the plasmonic nanoparticles. In general, hot dodecylamine (DDA) extraction or nitric acid sonication are relatively fast methods for breaking spores apart and releasing DPA. In the present invention, an autoclave method is used to break spores apart without using additional chemical reagents, and no sample dilution needs to be performed. For example, the endospore suspensions were autoclaved at 121° C. for 30 minutes to release all the available DPA.

Figure 12C:
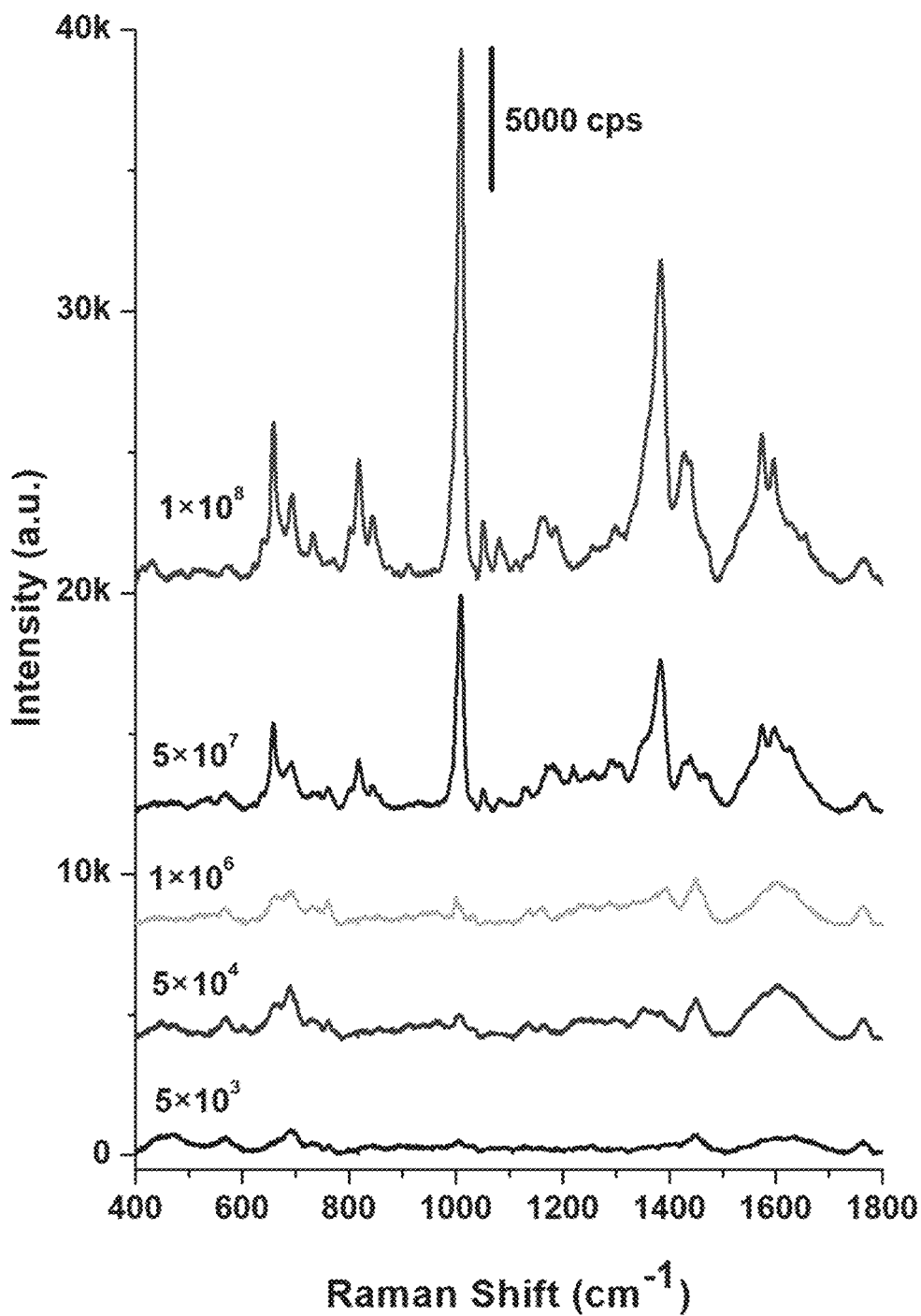
FIG. 12C shows the spore concentration-dependent SERS spectra of DPA.

To demonstrate the practicability of the developed SERS substrate as a SERS sensor for bacterial spore detection, it was applied for the detection of DPA as a representative biomarker. FIG. 12C shows the spore concentration-dependent SERS spectra of DPA, wherein the spore concentration is ranged from 5×10$^3$ to 1×10$^8$ spores/mL. In the test, the exposure time was 10 seconds, and the average of spots was 6. The results showed that the LOD of *B. subtilis* spores was 5×10$^3$ spores/mL. Consequently, it can be calculated that a 3 µL droplet contains a total of just 15 spores, which is much lower than the infective dose of 10$^4$ spores. The best values previously reported were equivalent to 18.3 spores (1×10$^{-6}$ mol/L DPA in a 0.2 µL sample) by the meso-SERS technique or 1000 spores by the silver-doped sol-gel method. It is believed that the number of 15 spores is the lowest number of spores ever detected by SERS. In other words, the sensitivity of the SERS substrate provided in the present invention is greatly improved.

On the other hand, the present invention also provides a SERS detection method. First, a SERS substrate fabricated by the method described above is provided. Afterwards, a sample is applied to the SERS substrate, and then the Raman spectra of the sample is collected. Since the sensitivity of the SERS substrate provided in the present invention is greatly improved, the substrate area and the sample volume can also be reduced. For example, the SERS substrate is cut to have an area less than 10 mm$^2$ (e.g. 4~10 mm$^2$) before applying the sample thereon, and the volume of the sample applied to the SERS substrate is less than 5 μL (e.g. 1~5 μL). Further, the Raman spectra can be measured in wet or dry conditions.

Moreover, the Raman spectra measured using the SERS substrate provided in the present invention can be applied to various fields and purposes, such as, but not limited to, the industrial fields of medical use, environmental protection, food and materials, and the special purposes of criminal investigation, and investigation of drug abuse, poison prevention, terrorist attacks and biochemical warfare agent.

In conclusion, the present invention developed a facile, inexpensive, and easy-to-fabricate hydrophilic membrane-based SERS substrate with high sensitivity and reproducibility. Dipping the hydrophilic membrane in alcohol and chloride ion aqueous solution before AgNP deposition was found to dramatically enhance the Raman signal intensity up to 188-fold. The fabricated SERS substrate demonstrated subnanomolar sensitivity to R6G using 3 μL of aqueous sample volume on a 3×3 mm$^2$ SERS substrate, with less than 1 min detection time and without additional concentration or drying processes. When used as a SERS sensor for bacterial spore detection, the limit of detection of B. subtilis spores was 5×10$^3$ spores/mL, which was equivalent to 15 spores in a 3 μL sample volume. Overall, the optimized configuration of low substrate area and micro-analyte volume indicates that the proposed substrate and method have great potential to be used in routine laboratory and on-site analysis in public safety, medical care and various fields.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A fabrication method of a surface-enhanced Raman scattering (SERS) substrate, comprising:
    preparing a hydrophilic membrane comprising:
        10~20 wt % poly(vinylidene fluoride) (PVDF), polytetrafluoroethylene (PTFE), polycarbonate (PC), polyethersulfone (PES), polyamide (nylon), or mixtures thereof;
        10~20 wt % polyvinylpyrrolidone (PVP); and
        0.2~1.6 wt % poly(methyl methacrylate) (PMMA), poly(2-hydroxyethyl methacrylate) (PHEMA), or mixtures thereof;
    dipping the hydrophilic membrane in an alcohol;
    immersing the hydrophilic membrane in a chloride ion aqueous solution; and
    depositing Ag or Au nanoparticles on the hydrophilic membrane by suction filtration to form the SERS substrate.

2. The method according to claim 1, wherein the molecular weight of PVDF, PTFE, PC, PES or nylon is ranged 1~10000 kDa.

3. The method according to claim 1, wherein the molecular weight of PVP is ranged 1~10000 kDa.

4. The method according to claim 1, wherein the molecular weight of PMMA or PHEMA is ranged 1~10000 kDa.

5. The method according to claim 1, wherein the alcohol is methanol, ethanol, propanol, isopropanol, C4 to C20 alcohols or mixtures thereof.

6. The method according to claim 1, wherein the concentration of the chloride ion aqueous solution is ranged 0.1~10 M.

7. The method according to claim 1, wherein the chloride ion aqueous solution is metal chloride aqueous solution, and the metal is selected from the group consisting of I A metals, II A metals, III B metals, transition metals and mixtures thereof.

8. The method according to claim 1, wherein the Ag or Au nanoparticles are Ag or Au nanoparticles in different shapes.

9. The method according to claim 1, wherein the Ag or Au nanoparticles are shaped as spheres, rods, triangles, cubes, cuboids, cylinders, wires, stars, flowers or mixtures thereof.

10. The method according to claim 1, wherein sizes of the Ag or Au nanoparticles are ranged 1~1000 nm.

11. The method according to claim 1, wherein aspect ratios of the Ag or Au nanoparticles shaped as rods are ranged 1~20.

12. A surface-enhanced Raman scattering (SERS) detection method, comprising:
    providing a SERS substrate fabricated by the method of claim 1;
    applying a sample to the SERS substrate; and
    collecting Raman spectra of the sample.

* * * * *